(12) United States Patent
Scott

(10) Patent No.: US 6,437,286 B1
(45) Date of Patent: Aug. 20, 2002

(54) SLAG COLLECTION AND REMOVAL SYSTEM FOR A HEAVY DUTY LASER-EQUIPPED MACHINE TOOL

(75) Inventor: William B. Scott, Rochelle, IL (US)

(73) Assignee: W. A. Whitney Co., Rockford, IL (US)

( * ) Notice: Subject to any disclaimer, the term of this patent is extended or adjusted under 35 U.S.C. 154(b) by 141 days.

(21) Appl. No.: 09/648,309

(22) Filed: Aug. 25, 2000

Related U.S. Application Data

(63) Continuation of application No. 09/302,277, filed on Apr. 30, 1999, now Pat. No. 6,127,648, which is a continuation of application No. 09/302,278, filed on Apr. 30, 1999, now Pat. No. 6,246,025.

(51) Int. Cl.⁷ .......................... B23K 26/16; B23K 26/36
(52) U.S. Cl. ................................. 219/121.82
(58) Field of Search ................ 219/121.67, 121.72, 219/121.82

(56) References Cited

U.S. PATENT DOCUMENTS

| | | | | |
|---|---|---|---|---|
| 4,452,115 A | | 6/1984 | Bredow .................. | 83/157 |
| 4,659,902 A | * | 4/1987 | Swensrud et al. | |
| 5,585,015 A | | 12/1996 | Hayashi et al. ......... | 219/121.67 |
| 5,637,243 A | | 6/1997 | Sato et al. ............. | 219/121.67 |
| 5,648,002 A | | 7/1997 | Omote .................. | 219/121.82 |
| 5,756,961 A | | 5/1998 | Sato et al. ............. | 219/121.67 |
| 5,854,460 A | | 12/1998 | Graf et al. ............. | 219/212.67 |

FOREIGN PATENT DOCUMENTS

| | | |
|---|---|---|
| JP | 6-99296 | 8/1986 |
| JP | 5-161990 | 6/1993 |
| JP | 6-99296 | 4/1994 |
| JP | 7-155991 A * | 6/1995 |
| JP | 8-132271 A * | 5/1996 |

OTHER PUBLICATIONS

Laser Cutting Heavy Plate, Industrial Laser Review, Aug. 1995.

Trumpf Brochure Five Axes Laser Processing Center, No Publication Date.

* cited by examiner

*Primary Examiner*—Geoffrey S. Evans
(74) *Attorney, Agent, or Firm*—Leydig, Voit & Mayer, Ltd.

(57) ABSTRACT

An insulated slag collection bed and scrap removal system for a high powered laser-equipped machine tool. The slag collection bed serves as a shield to absorb remnant laser energy which would otherwise strike the machine base. The shield is thermally insulated from the machine base so as to protect the machine base from the temperature rise in the shield resulting from absorbing the remnant laser energy. If, over time the shield is damaged or worn, apparatus is provided for ready replacement of both the shield and the insulation. The scrap removal system has a home position in which all of its components, including a scraper assembly and a drive are out of the range of the laser beam, so that they are protected from laser damage. The drive is energized to pull a scraper assembly through the machine with a plow having a lower surface in contact with the stationary collection bed for scraping slag and pushing it toward the open end of the machine. When the machine reaches the end of its travel, the drive, as it continues its motion, automatically raises the plow, pushes the scrap off the end, then returns to its home and protected position, with the plow out of contact with the collection bed so as not to pull debris back into the machine.

20 Claims, 19 Drawing Sheets

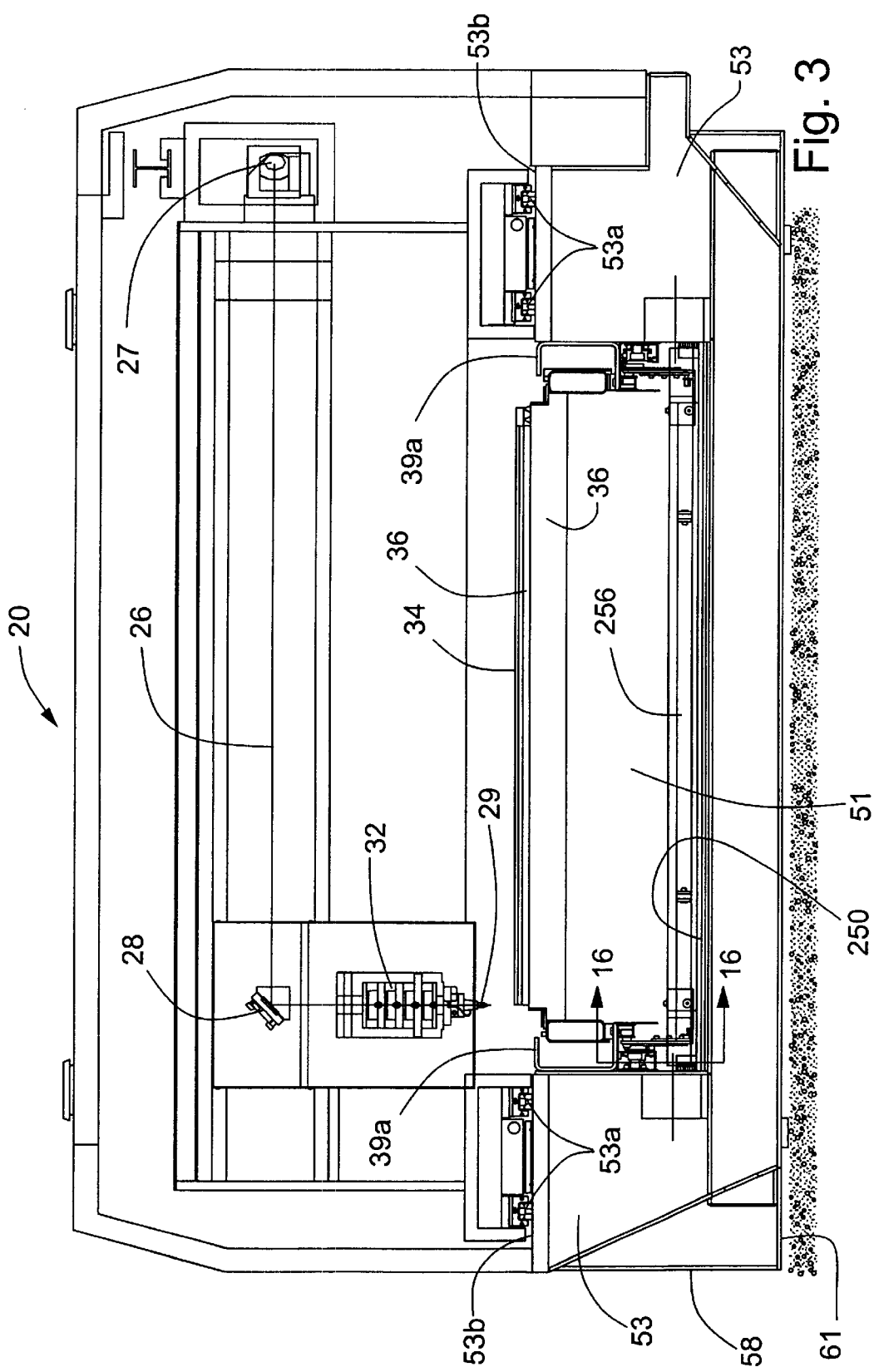

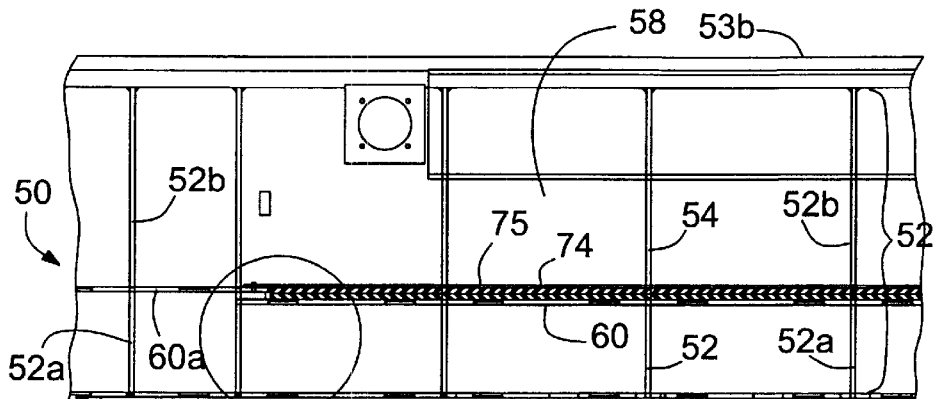
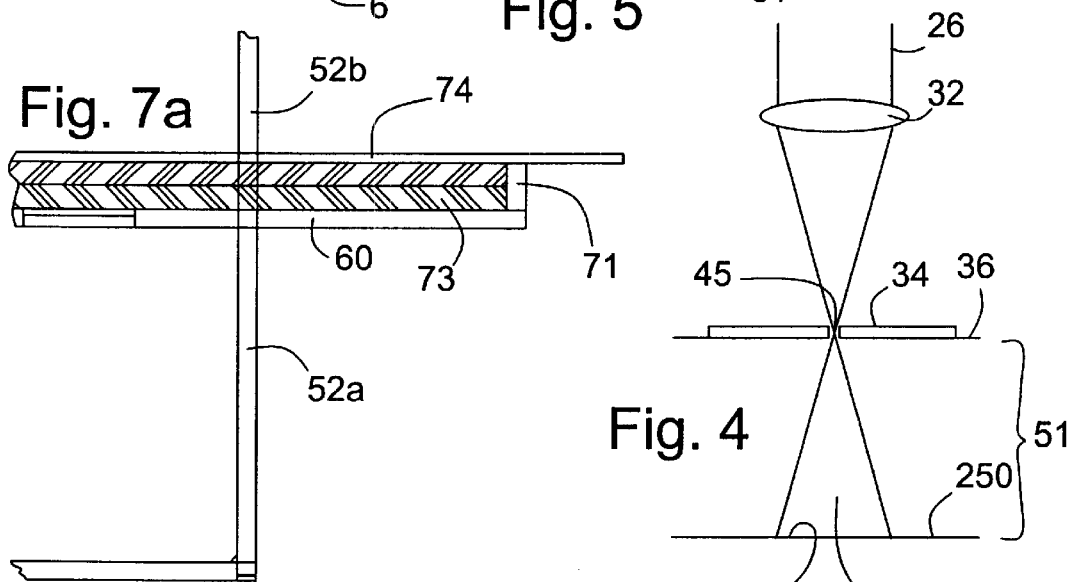
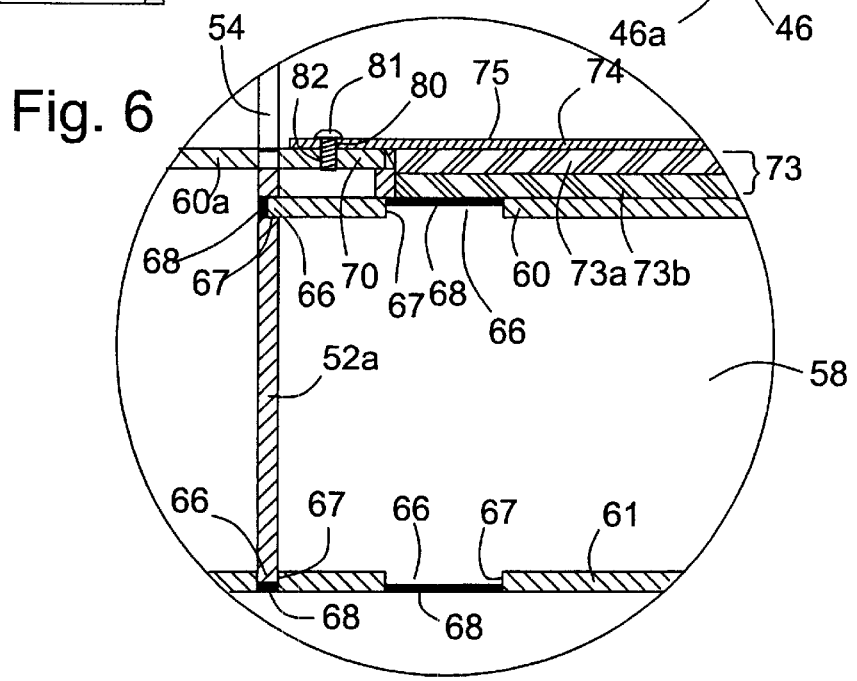

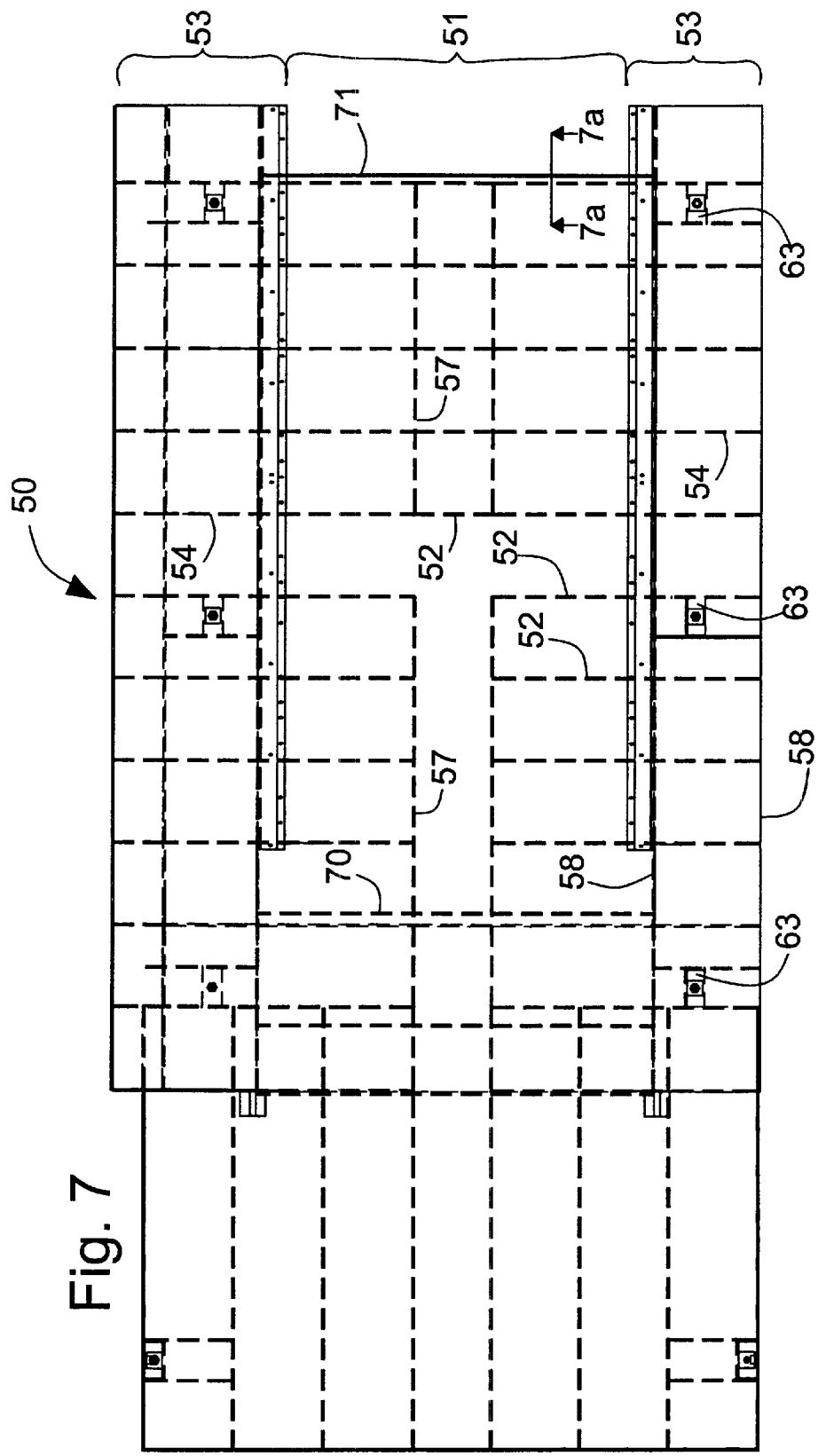

SLAG COLLECTION AND REMOVAL SYSTEM FOR A HEAVY DUTY LASER-EQUIPPED MACHINE TOOL

RELATED APPLICATIONS

This application is a continuation of U.S. application Ser. No. 09/302,277, filed Apr. 30, 1999, now U.S. Pat. No. 6,127,648, and U.S. Ser. No. 09/302,278, the teachings and filed Apr. 30, 1999, now U.S. Pat. No. 6,246,025, disclosure of which are hereby incorporated in their entirety by reference thereto.

FIELD OF THE INVENTION

The present invention generally relates to machine tools, and more particularly relates to machine tools using lasers for cutting metal and other materials.

BACKGROUND OF THE INVENTION

Laser-equipped machine tools are often used to cut parts from sheet metal and relatively thin plate. In such machine tools a laser beam concentrated by a focusing lens or mirror to a small diameter spot, is directed to position the focal point above, on or below the surface of the material to be cut. The laser beam is directed from the focusing optic through a nozzle disposed immediately above the material workpiece, with a pressurized gas being directed through the nozzle, typically coaxial with the laser beam, to assist making the cut. The pressurized gas interacts with the laser beam and material, facilitating the cutting process, and creates a gas stream which carries the removed material away from the cut.

Laser-equipped machine tools are Computer Numerically Controlled and are manufactured in many configurations and sizes and with lasers of various types and power. In one configuration, "flying optics", the cutting head is adapted for movement along one axis, such as the Y-axis which is mounted on a bridge, and the bridge is adapted for movement in an orthogonal, X-axis. The work is supported on a stationary pallet or table below the bridge. Movement of the cutting head is coordinated with movement of the bridge to define a precise path on the part. The cutting head and laser are controlled to pierce and cut the workpiece to form holes and shapes in the material, then to cut the part from the material. In this configuration the laser is mounted on the stationary machine base or on a separate floor mounted stand.

When using laser-equipped cutting machine tools it is advantageous to utilize optics with different focal lengths to cut various thicknesses of material. The focal length of the optic contributes to the diameter of the focal spot and thus the energy density, Watts per unit area, at the focal spot. Shorter focal length optics create smaller focal spots having higher energy densities. The focal length of the optic also contributes to depth of focus of the focal spot with longer focal lengths having greater depth of focus. Shorter focal length optics are advantageous for cutting thinner materials while longer focal length optics are advantageous for cutting thicker material. Primarily the focal length of the optics and the power level of the laser contribute to the energy density remaining in the laser beam at distances beyond the workpiece.

Many same or different parts of common thickness and material type may be cut from a sheet or plate. Such groups of parts are commonly referred to as a nest. Left over material, after the parts have been removed, is referred to as a remnant or a skeleton. A small remnant which falls from a hole cut in a part is called a slug. Remains of material from the cut is called slag. Resolidified material clinging to the part is called dross. The mixture of slugs and slag residue from cutting sheet material is generally called scrap.

Various means for collecting and removing scrap from laser cutting machines have been utilized. One version is to allow the scrap to accumulate on the floor or on a platform or bed disposed below the cutting area. When the accumulation is excessive it is shoveled out. This method is advantageously low cost. It also has disadvantages. The machine must be shut down while the scrap is removed, reducing productivity. Debris falling from the shovel, can land on way covers or machine parts, where not wanted, leading to premature failures.

Another version is to provide one or more scrap collecting pans under the cutting area to collect the scrap. This solution is also advantageously low cost. It also has disadvantages. The machine is normally shut down while the scrap is removed, reducing productivity. If an excessive amount of scrap is allowed to accumulate, the pans are very difficult to remove. The scrap pans may be large and hard to handle.

Another version is to provide a conveyor disposed below the cutting area to carry or drag the scrap from the machine. While this arrangement costs more, it also improves machine productivity by eliminating machine shut down for removal of scrap. Conveyor systems, however, can increase the height of the bed by an unacceptable amount, and are also prone to damage.

The problems of scrap collection and removal become more acute in what are characterized as "high power" laser cutting machines (usually encompassing machines with lasers of 3 kw or more), because of the potential for machine damage by the high power laser beam. Adapting high power lasers to cut thicker materials leads to using focusing lenses with longer focal lengths. Below the focal point, a laser beam expands at approximately the same rate that it was focused. For example, if a 35 mm diameter laser beam is focused by a lens with a 10" focal length, then, 10" below the focal point, unless absorbed by the material cut, the beam would be about 35 mm in diameter again. Twenty inches below the focal point the beam would be about 70 mm in diameter. This remnant diverging beam from high power lasers have considerable capability to cause damage. For example in testing leading to the present invention, a 0.125" thick aluminum plate was scuffed with steel slag, then a 38 mm diameter 5500 Watt beam was directed at the surface. The aluminum was cut through in 40 seconds. Similar tests were made with 0.25" inch thick stainless steel and carbon steel. Both were cut through in well under a minute. These tests indicated that a scrap collection bed or scrap removal system underlying the cutting area of a high power laser system, with long focal length optics in use, would be at considerable risk of being damaged by the remnant laser beam.

SUMMARY OF THE INVENTION

In view of the foregoing it is a general aim of the present invention to provide a system for collecting and periodically removing scrap and slag from a high power laser-equipped machine tool, which has a substantially reduced risk of being damaged by the laser beam.

It is an object of the present invention to provide a scrap collection and removal system that automatically removes the scrap produced by the laser, but which is protected from damage from the remnant laser beam.

It is another object of the invention to provide a bed for the scrap collection and removal system, which, should it be melted by a high power laser beam, has some capability for self healing.

More specifically, an object of the present invention is to provide a protected scrap removal system which is operable with a stationary scrap collection bed that shields the machine base from laser damage, the scrap removal system therefore operating entirely above the scrap collection bed.

Yet another object of the present invention is to provide a sturdy and reliable scrap removal system which is positively and reliably driven to remove the scrap, yet in which all of the components are out of the path of the laser during cutting.

It is yet another object of the present invention to provide a scrap removal system that accommodates minor variations in the surface of the scrap collection bed.

It is a feature of the invention that the height of the machine tool is kept desirably low while still adequately protecting the machine base from the laser, which can be a high power laser beam focused by long focal length optics.

It is a further feature of the invention that a replaceable laser shield in the form of a fixed bed covers the machine base in the cutting area and collects scrap and slag resulting from machining, and a slag scraper assembly is associated with the fixed bed, shielded from laser radiation, yet immediately available to perform a cleaning cycle by scraping scrap and slag from the bed on demand.

It is a feature of the invention that the scrap collection surface is stationary, a plow is traversed across the stationary bed to remove scrap, and a chain drive controls multiple positions of the plow for (a) a cleaning pass with the plow down, (b) raising the plow to an inoperative position, and (c) retraction to the stowed protected position.

It is an aspect of the invention that the scrap removal system automatically adjusts to accommodate minor variations in the surface of the scrap collection bed. This is primarily accomplished by two features. First, the scraper blade spanning the width of the bed is segmented into multiple individual blades. Second, each of the individual blades automatically adjusts upwardly relative to the bed surface in response to small variations in the surface. Preferably, the individual blades are adjustably mounted to the scraper in the vertical direction, and biased towards the scrap collection bed.

Other objects and advantages of the invention will become more apparent from the following detailed description when taken in conjunction with the accompanying drawings.

BRIEF DESCRIPTION OF THE DRAWINGS

FIG. 3 is an end elevation sectional view of the machine tool of FIG. 1 and further showing the outline of an enclosure for the machining area;

FIG. 4 is a diagram illustrating the remnant laser beam;

FIG. 5 is a sectional view taken along the line 5—5 of FIG. 2, and better illustrating the insulated bed structure;

FIG. 6 is an enlarged sectional view of area 6 shown in FIG. 5;

FIG. 7 is a plan view showing the machine base of the machine tool of FIG. 1;

FIG. 7a is an enlarged sectional elevation view taken along line 7a—7a of FIG. 7;

Figure 1:
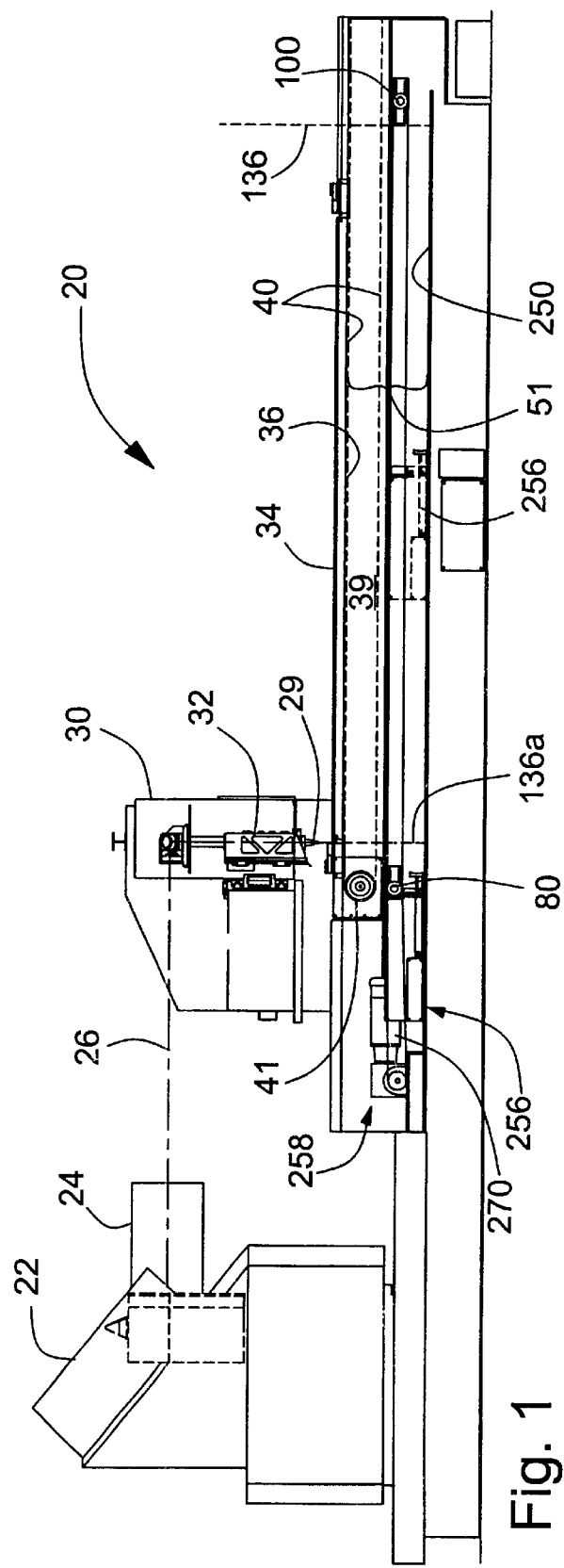
FIG. 1 is a sectional elevation of a laser-equipped machine tool taken along the line of 1—1 of FIG. 2, with the machine enclosure removed, and having a scrap collection and removal system exemplifying the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Referring now to the drawings, and with specific reference to FIG. 1, a preferred embodiment of the present invention is generally depicted as embodied in machine tool 20. By way of background machine tool 20 includes a laser source 22 which directs a high power laser beam to a collimator 24, which in turn directs a collimated laser beam 26 (See FIG. 2) to first bending mirror 27. The laser beam 26 is then directed to second bending mirror 28 and then to cutting head 30 which includes a focusing optic 32 (See FIG. 4) which focuses the laser beam onto metal plate or workpiece 34. The laser beam 26 is projected through a nozzle 29 at the base of the cutting head along with a supply of assist gas, such as nitrogen or oxygen. The laser beam and assist gas interact with the metal to cut the workpiece 34. While an important use of laser cutting machines is the cutting of metal, it will be noted that other materials can be cut, and the invention is not limited to lasers for cutting metal.

Workpiece 34, in the preferred embodiment, is mounted on table or pallet 36 which is constructed for minimum interference with the laser beam, and to allow slag and scrap to readily fall therethrough. The pallet 36 is preferably made up of a plurality of bars spanning the pallet width, and turned on edge so that their narrow cross-section is presented to the laser. The upper edge of each bar is serrated in large tooth like fashion to support the workpiece at a plurality of points in bed-of-nails fashion. Such pallets or worktables are known in the laser cutting art, and will not be further described, except to note the feature that the scrap material generated during the cut will readily fall through the pallet. The pallet 36 can be moved into the work zone of the cutting head 30 using pallet drive system 39 which in the depicted embodiment includes a chain 40 and drive sprocket 41. It is also to be understood that the pallet 36 is actually one of two pallets which can be moved relative to the cutting head 30. While one pallet supporting a plate 34 is positioned in the machine for cutting, a second pallet is positioned in a loading station to have cut parts unloaded and raw material loaded. Such an arrangement provides for a more productive machine tool.

Figure 2:
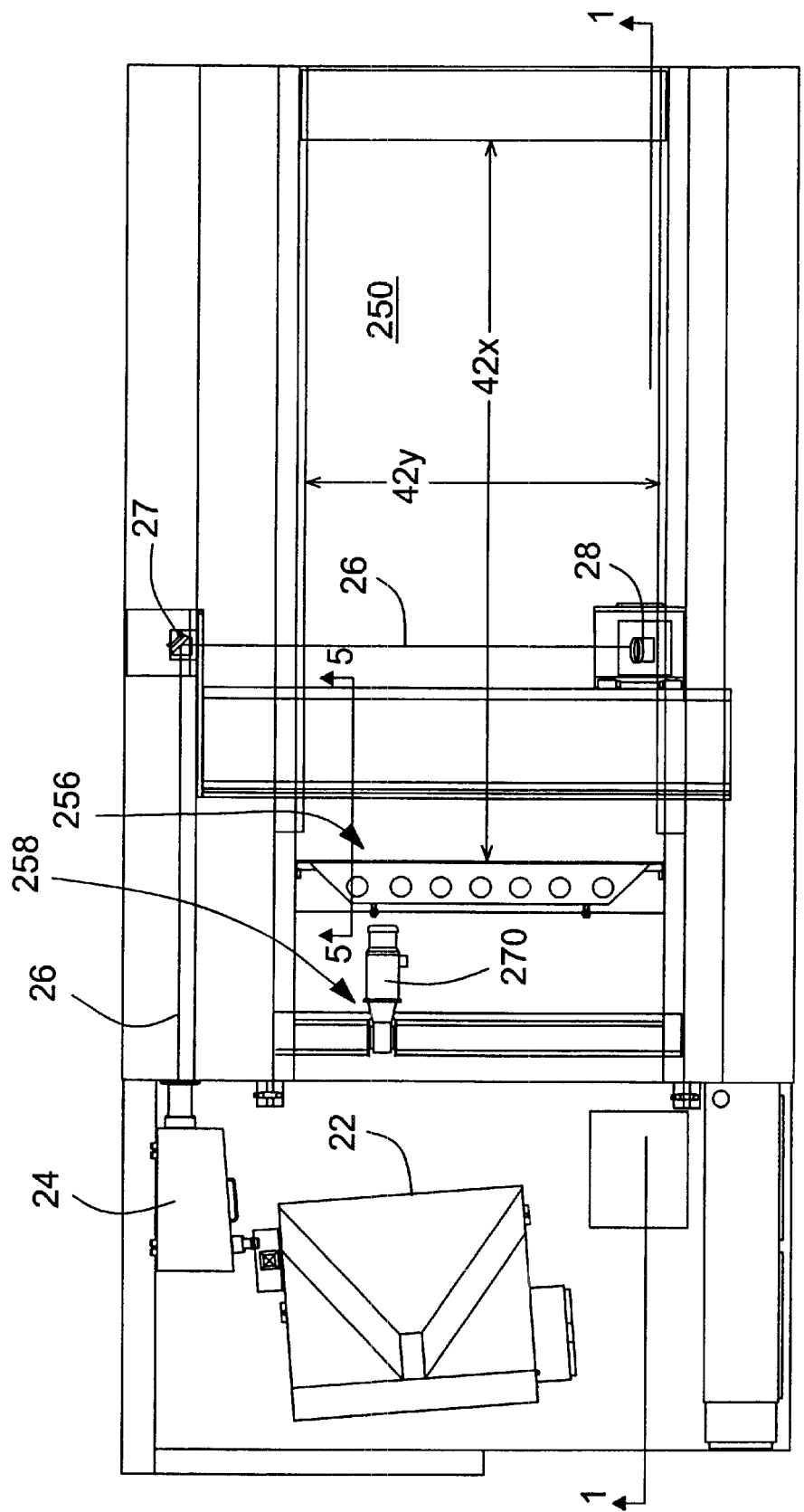
FIG. 2 is a plan view of the machine tool of FIG. 1.

The cutting zone is indicated in FIG. 2 by 42x which indicates the extent along the X-axis which can be traversed by the cutting nozzle, and 42y which indicates the extent along the Y-axis which the cutting nozzle can traverse. The machine tool is provided with a slag collection bed below the cutting zone 42 for the purpose of protecting the machine base from the remnant laser beam and also for the purpose of collecting scrap and slag which falls through the machine bed during the course of cutting parts.

Digressing briefly to FIG. 4, a schematic illustration of an optical system for a laser will illustrate the nature of the remnant laser beam. FIG. 4 shows schematically a focusing optic 32 on which is incident the primary laser beam 26, and which is brought to a focal point 45 at about the surface of the workpiece 34. A slag collection bed 250 is positioned below the pallet separated by a trough or air space 51 of approximately 18 inches, in a current implementation of the machine. The remnant laser beam 46 is shown as impinging on an area 46a having a sufficiently small diameter to include a dangerous and reasonably high energy concentration in the remnant laser beam 46. For example, if a 5,000 watt laser beam 35 mm in diameter were incident on a lens having a 10 inch focal length, if no workpiece were interposed so that there was no energy absorber in the beam path, at a position 10 inches below the focal point the remnant beam 46 would again be at 35 mm diameter and would have a power of the same level (e.g. 5,000 watts) as the incident beam. At 20 inches from the focal point the remnant beam would be 70 mm in diameter and still have significant and potentially dangerous energy density.

In a practical laser cutting machine, particularly one configured for high power, it is not convenient or practical to provide a sufficient air space between the nozzle and the slag collector to adequately protect the machine base. If the machine base protection problem were ignored altogether, there is a significant probability that at some time during the life of the machine the laser energy which was projected onto the base over time, including beams partly absorbed by the workpiece, or a direct beam when no workpiece is in place, would cause a failure in the base. When used herein, the term "remnant laser beam", unless context indicates otherwise, it is intended to encompass both beams partly absorbed by the workpiece, and those which project past the workpiece, and the energy contained in such beams.

Having discussed the potential harm from a high power laser to both the machine base and scrap removal system, attention will now be given to the machine base and scrap collection bed which the removal system services.

The machine base 50 supports the operative elements discussed thus far, including the table 36 and the cutting head 30, along with additional elements such as the slag collection bed, to be described below, and a slag removal system. Those familiar with such machines will appreciate that the base must be strong, rigid and stable in order for a high performance machine as illustrated to perform within its designed close machining tolerances.

In providing for a strong and rigid base, the illustrated embodiment uses a welded structure comprising elongated box structures, joined by a plurality of rigid cross-members. FIG. 7 shows the base in plan view, FIG. 5 in elevation and FIG. 6 in elevational section. As shown in end elevation in FIG. 3 the base is of U-shaped configuration, with a trough 51 underlying the worktable and cutting area, interposed between a pair of upstanding legs 53 at either side, which provide support, for example, for the ways 53a on which the bridge carrying the cutting head rides.

Thus, referring again to FIGS. 5 and 7, vertical plates 52 run in the lateral direction and are L-shaped with the foot 52a of the L underlying the trough 51, and the ascender 52b of the L underlying the legs. These parts may, for convenience be referred to herein as the short lateral plates 52a and the taller lateral plates 52b. Running longitudinally of the machine and intersecting the lateral plates 52 are longitudinal plates. Short longitudinal plates 57 are about the same height as the short lateral plates 52a and attached to those plates, to form a supporting structure within the trough 53. Taller longitudinally directed plates 58 are about the same height as the longer lateral plates 52b and define the sides of the legs 53.

FIG. 5 shows the structure in elevation, and also shows top and bottom members for the box structure. More particularly, a top is formed by a longitudinally extending horizontal plate 60, which establishes the level of the slag collection trough. A bottom plate 61 is fixed to the foot of each of the upstanding plates. The legs 53 are closed at their tops by plate 53b. Mounting pads 63 are rigidly affixed to the bottoms of certain of the box structure plates, as illustrated in FIG. 7, in order to provide a supporting structure for leveling of the machine. The base structure is a welded tab and slot construction, better illustrated in FIG. 6. Thus, the vertical longitudinal plates 57, 58, the vertical lateral plates 52, 54 and the horizontal plates 60, 61 have appropriate tabs 66 filling units slots 67 and welded, for example, at 68 to provide the rigidified box structure. This strength and rigidity is provided without the weight penalty of a cast base. The complex interlocked structure highlights the importance of protecting those elements from damage by the high power laser operating just above them.

In accordance with the invention, means are associated directly with the base for performing the functions of insulating the machine base from the laser and from high temperatures generated in the slag bed and the slag during the cutting operation, for collecting the slag in a way which allows for ready removal, and for providing a readily replaceable shield for the base which can be damaged during extended machine usage then replaced. The shield member is strong and durable, is insulated from the base itself, is relatively inexpensive, and can be replaced at relatively low cost, particularly as compared to repairing structural damage in the base.

With reference primarily to FIGS. 5 and 6, the preferred form of insulated machine base will be described. One of the horizontal plates 60a terminates in an extended lip 70 which extends across the entire width of the machine. The lip 70 is positioned out of the range traversed by the cutting head, so that it will not be exposed directly to the laser beam. A supporting plate 71 is provided at the far longitudinal end of the machine (see FIGS. 7 and 7*a*). The plate 71 can, as suggested in FIG. 7*a* be in the form a bar having a length equal to the width of the bed, and placed on edge as illustrated in to close the bottom of the pocket now to be described. The plates are positioned to provide support surfaces at a known distance above the top surface of the horizontal plate 60. The known distance provides a chamber to receive and hold insulation material as shown in FIGS. 5, 6, and 7*a*. Thus, sheet like insulation material 73 is disposed in the chamber formed between the supports 70, 71 so that it forms a top surface which is co-planar with the supports 70, 71. Overlying the insulation material 73 is a metal plate 74, preferably steel, which has an outer surface 75 serving as the collection surface for the slag and scrap, and a laser shield for the base.

The insulation 73, in addition to performing its insulation function, provides a flat supporting surface for the protective shield 74. There will be times in machine operation where the shield will be heated to the point of sagging or even melting. Providing a firm planar underlying support allows the metal of the shield 74 to resolidify while still retaining its substantially planar configuration.

For insulation, it is currently preferred to use ordinary gypsum board, preferably two sheets 73*a*, 73*b*, totaling about 1.25 inches in thickness. The gypsum board 73*a*, 73*b* is inexpensive, and can be readily obtained and easily cut to size. It is easy to dispose of when it needs to be changed. It provides a flat planar surface for supporting the protective plate 74 and can withstand the temperatures if the plate melts, while continuing to support the plate during the resolification interval. It is preferred to use two sheets of gypsum board so that the gap therebetween provides a further barrier to heat transfer.

Figure 8:
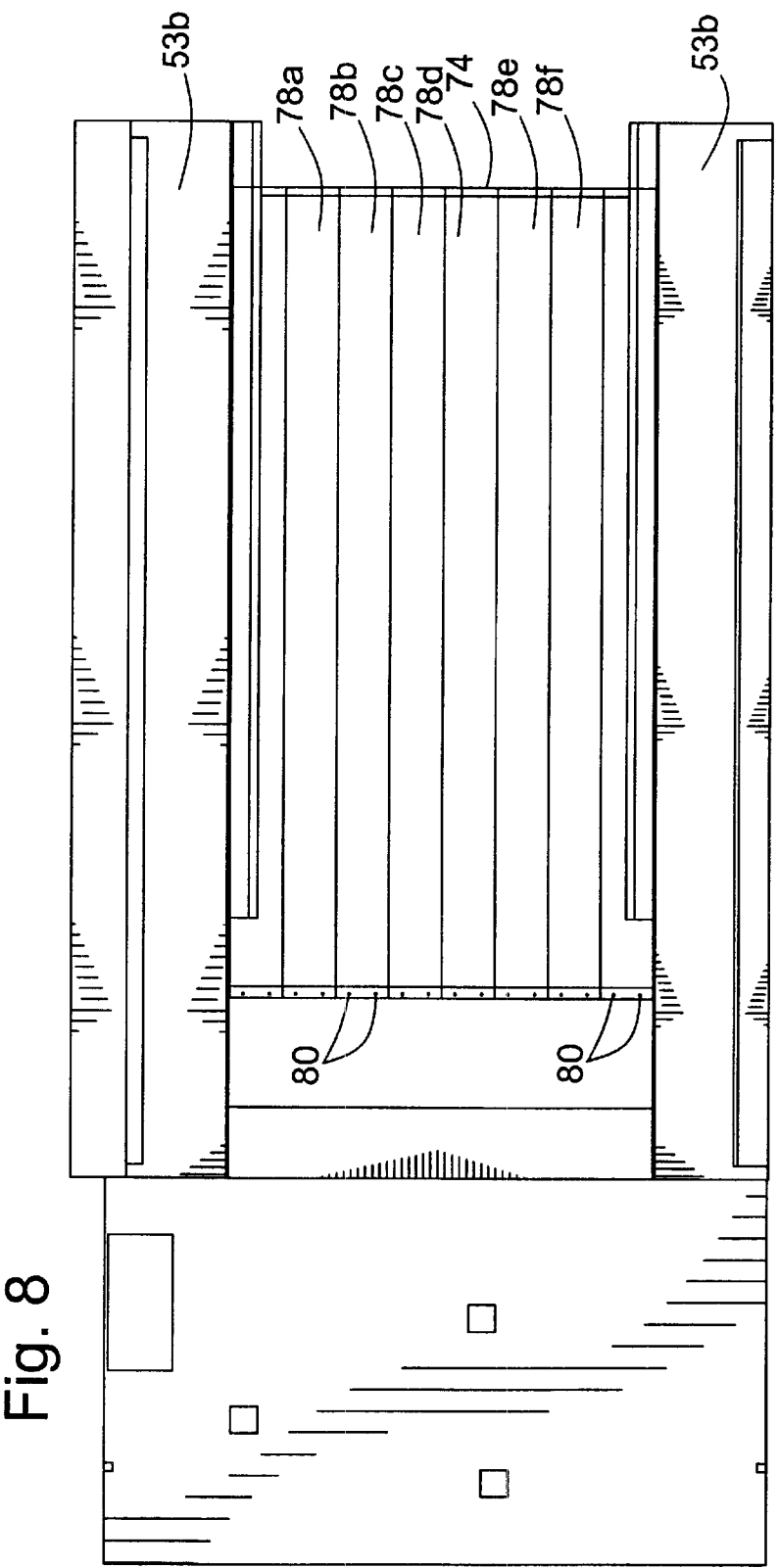
FIG. 8 is a plan view of the laser shielding plates.

The protective plate 74 is preferably comprised of a plurality of individual side by side strips 78*a*, 78*b*, etc, as best seen in FIG. 8. The strips span from the left hand supporting lip 70 to the right hand supporting lip 71 and are supported by the gypsum board between the lips. In this illustrated embodiment, each strip has a pair of apertures 80 through which fasteners 81, such as a conventional machine bolts, project to fit into threaded holes 82 in the forward lip 70 to thereby fix the strip in place. Attachment need not be made at the other end (at the strip 71), to allow freedom for the strip to expand and contract. Other attachment or drop-in arrangements can be used. If one or more strips are damaged during the course of long use of the laser cutting tool, or during an accident, it is a relatively simple matter to remove the fasteners 81, remove one or more damaged strips, and replace them with equivalent strips, whereupon the machine is again ready for operation. It is not necessary to replace the entire bed at once, but only a single strip whenever it is required. Similarly, if the insulation material is damaged at some point, a number of strips can be removed for replacing entire sheets of gypsum board or sections thereof can be cut out and replaced with sections of equal size.

With respect to the materials of construction of the insulated bed, the aforementioned double sheet gypsum is the currently preferred embodiment, but it will be clear to those skilled in the art, that other forms of insulation can be used. Gypsum board is however useful in the present application because it is low in cost, rugged, and has a very low thermal conductivity factor, approximately 0.062. Any equivalent material should have a conductivity factor at about the same or lower value, preferably at least 0.1 or lower. Tests utilizing gypsum board have determined that even though the laser can produce temperatures in excess of 2500° F. at the surface 75 of the shield 74, the temperature between the gypsum board layers 73*a*, 73*b* can be maintained at less than 600° F., and that the temperature at the bottom surface of the bottom layer 73*b* can be maintained at less than 150° F, well below the point at which the machine base will experience any thermal damage.

It was also noted above that strips 74 are preferably steel. This is due in part to the fact that steel has been found adequate to resist the detrimental effects of slag for a time, and is relatively inexpensive and available. Aluminum, while a good thermal conductor, is not sufficiently hard to withstand the slag removal process. Other alloys might be used and be effective, but typically at a higher cost than steel.

In practicing the invention, the structure which insulates the base structure from damage also serves as the facility for collecting slag and scrap generated during the cut.

In accordance with the invention, a slag removal apparatus is associated with the stationary bed and is configured to be protected from the high power laser. The apparatus is shielded from incident laser radiation, and protected from slag, but has access to the entire slag collection surface for removing scrap and slag therefrom. As shown in FIGS. 1 and 2, both a scraper assembly 256 and its drive mechanism 258 are entirely removed from the cutting area and therefore cannot be damaged or destroyed by remnant laser beam46 (FIG. 4).

More specifically, scraper assembly 256 is sized to span across collection bed 250 in a lateral direction (along the Y-axis) and includes a replaceable scraping pad 260 which is preferably manufactured from a plastic material having high durability and a low coefficient of friction to facilitate the sliding action of scraper 256 across collection bed 250. Preferably the scraper pad 260 is formed of ultra high molecular weight polyethylene. Drive mechanism 258 is connected to drive scraper 256 from the stowed position shown in FIG. 1 in solid lines to the active position shown in dashed lines in FIG. 1.

Figure 12:
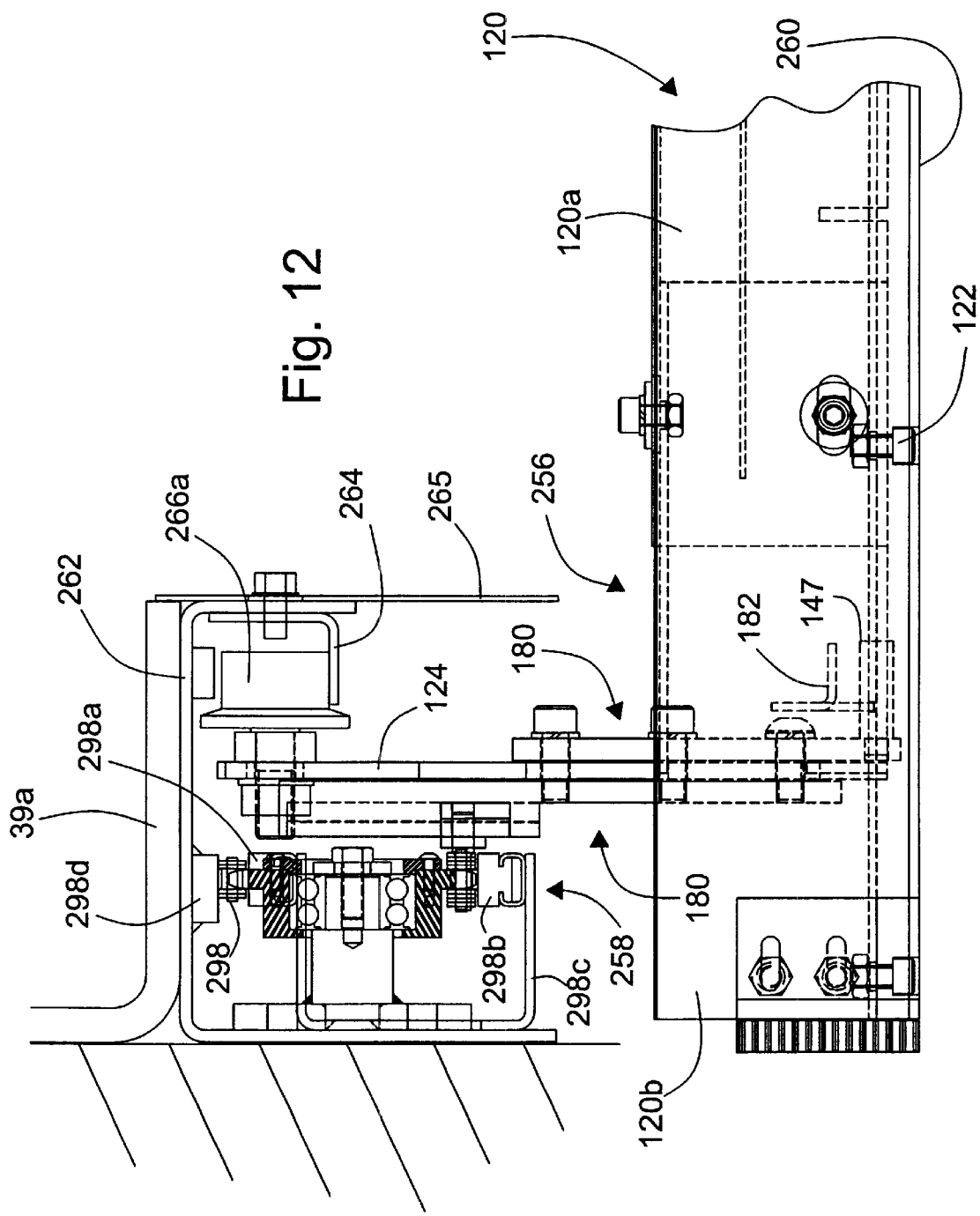
FIG. 12 is a diagram, partly in section, illustrating the left-hand scraper blade drive at the loading station end of the machine.
Figure 13:
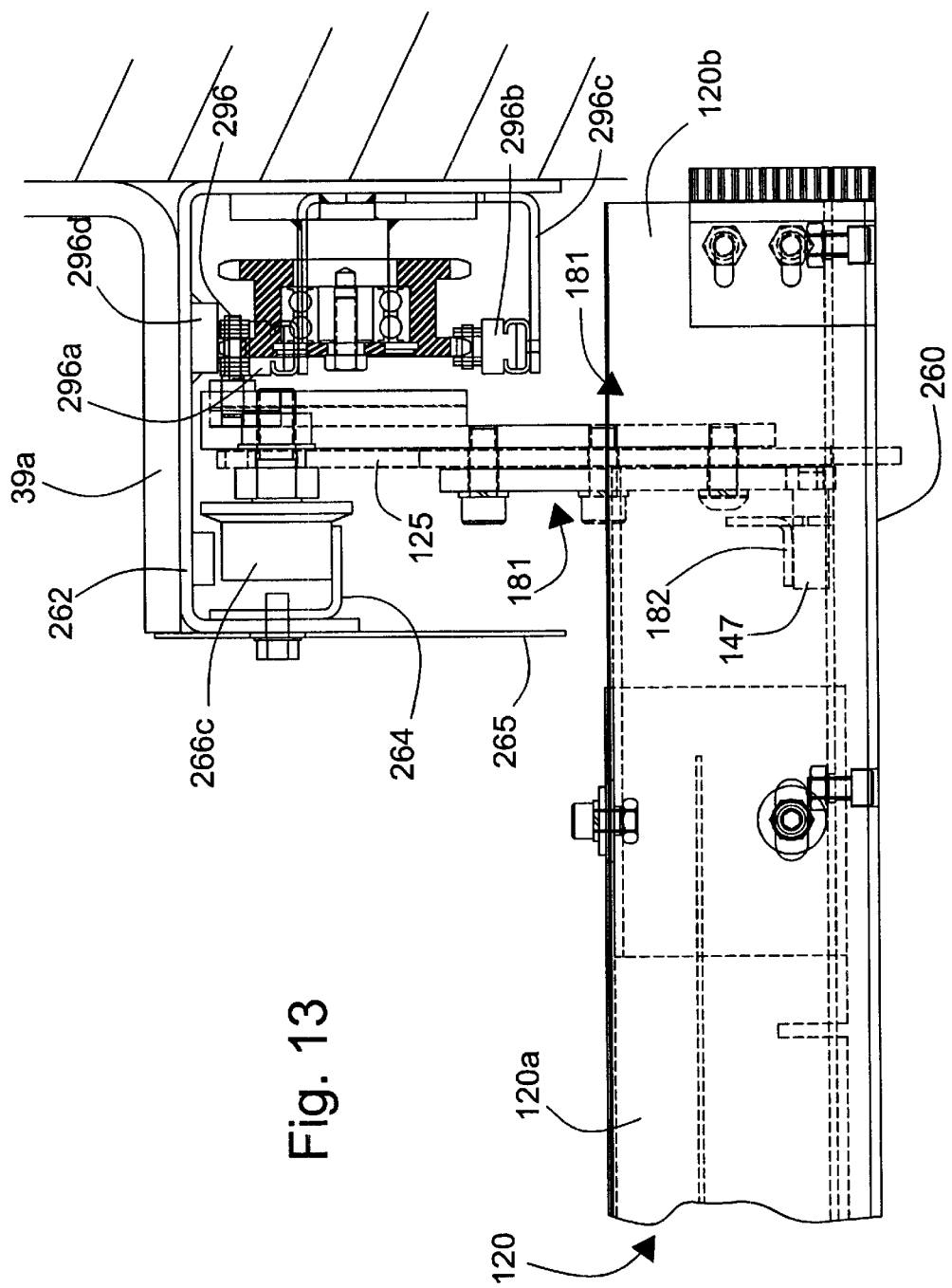
FIG. 13 is a diagram similar to FIG. 12 but illustrating the right hand drive at the end of the bed nearest the laser and with the blade in the raised position.

As shown in FIG. 3, and in further detail in FIGS. 12 and 13, drive mechanism 258 is protected by an angled shroud 262 which supports angular rail 264 across which rollers 266 are able to ride. A shroud 262 and a rail 264 are positioned on each side of the slag collection bed, and are affixed to the inner vertical sidewalls of the machine base beneath a C-shaped member 39a which supports the pallet. The shrouds and the rails extend for the entire length of the machine so as to carry the scraper assembly 256 from its most advanced position at the loading end of the machine to its most retracted stowed position, well out of the path of the laser beam. A depending shield 265 is also attached to the bracket 262, and is removable for service of the drive, but when in position further protects the mechanism from falling debris.

Figure 9:
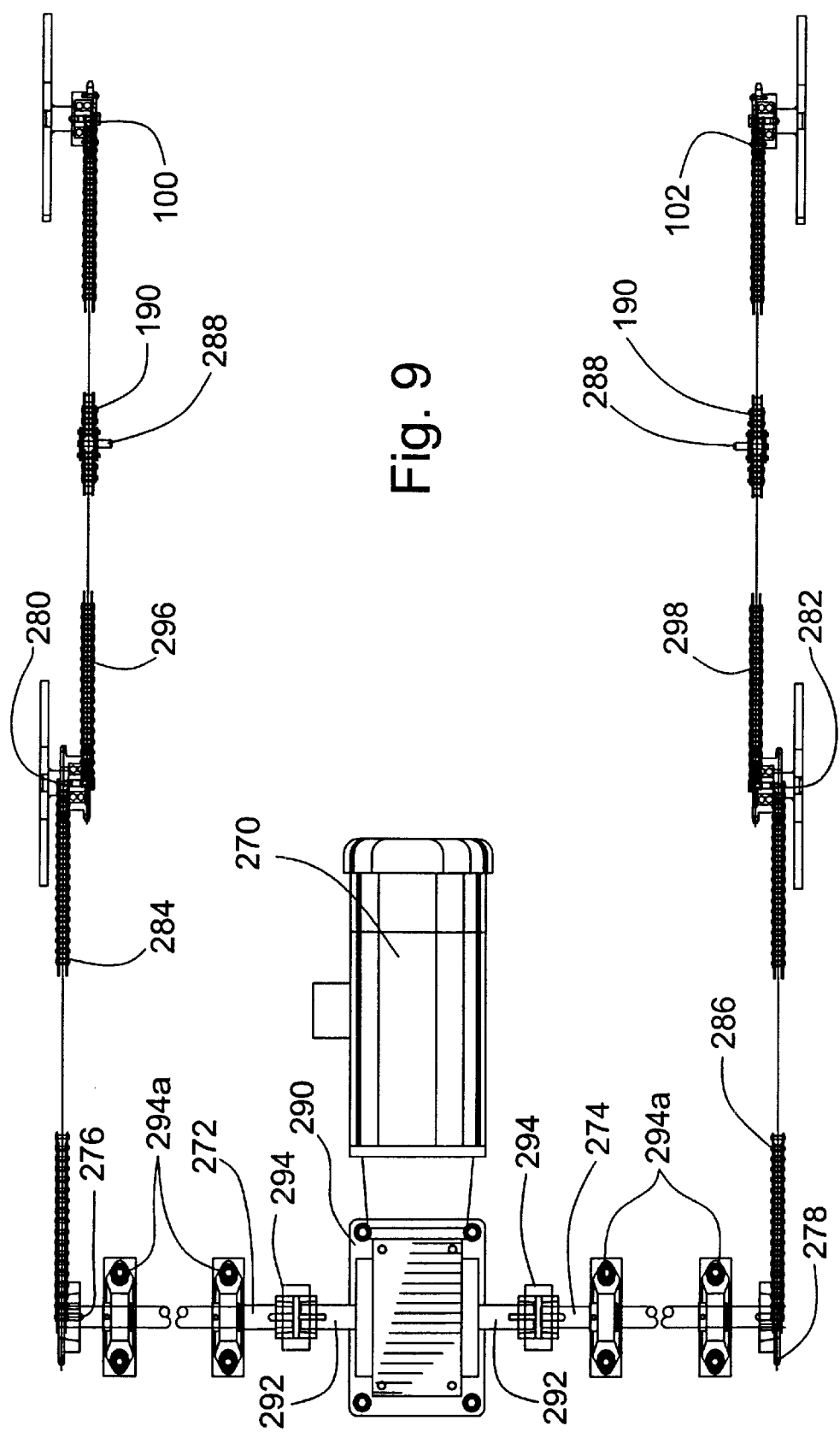
FIG. 9 is a diagram showing a drive system for the scrap removal system of the machine of FIG. 1.
Figure 10:
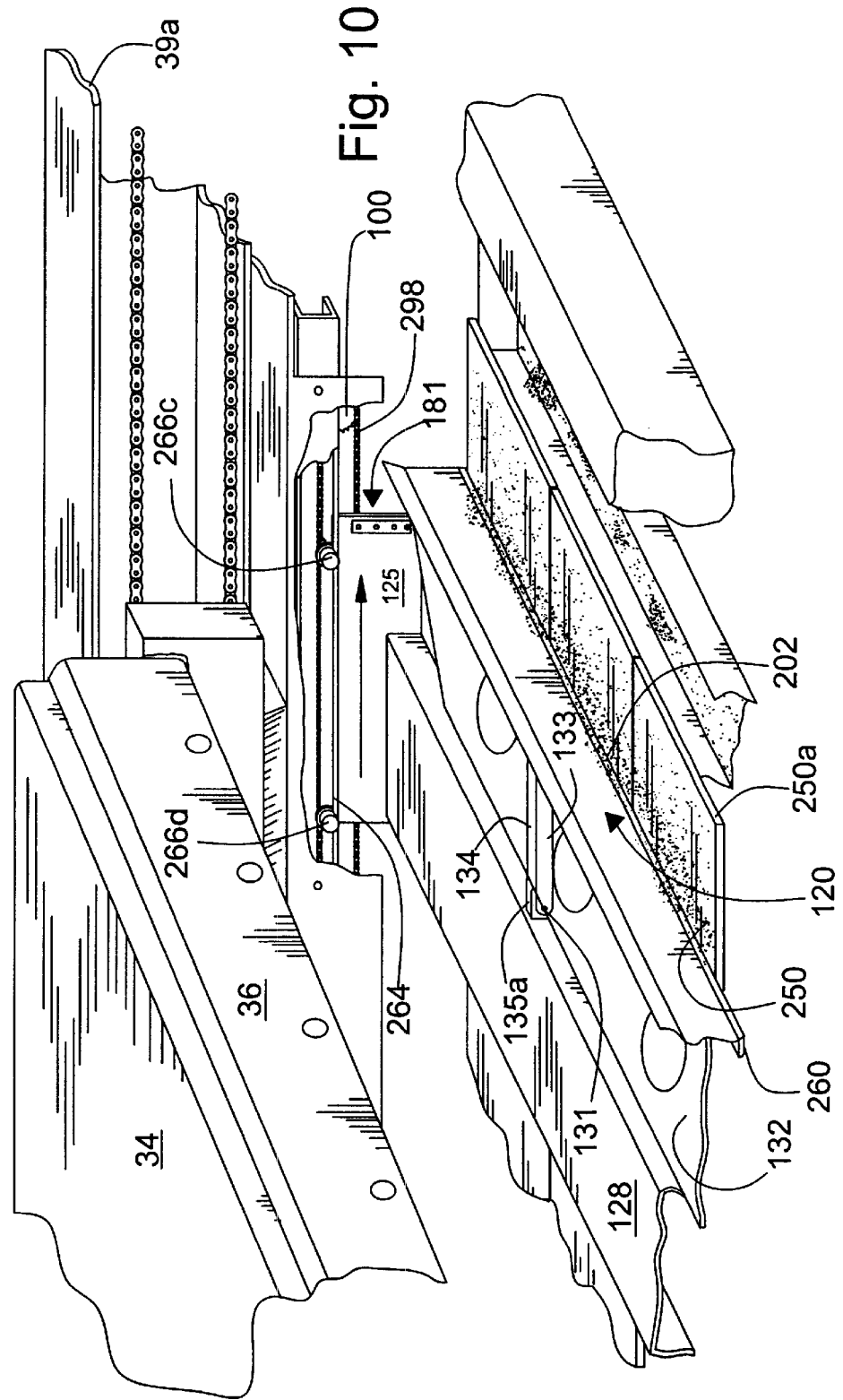
FIG. 10 is a perspective view, partly broken away, of the laser-equipped machine tool of FIG. 1 showing the scrap removal mechanism near the end of a cleaning pass.

Rollers 266, which carry the scraper assembly, are mounted on side plates 124, 125. Recognize that rotation of rollers 266 is passive in the preferred embodiment in that a drive shaft is not directly connected to rollers 266. Rather, in the preferred embodiment, movement of scraper 256 is actuated through motor 270 as best shown in FIGS. 1 and 9. The motor is positioned safely outside of the cutting zone 42 and has a reliable chain drive connected thereto, with the chain runs also being outside of the cutting zone and protected from slag and scrap. As shown in FIG. 9 a reducer 290 is connected to first and second drive shafts 272 and 274, which in turn are connected to single sprockets 276 and 278, respectively, which in turn are connected to double sprockets 280 and 282, respectively, by first and second chains 284 and 286. Rotation of the double sprockets 280 and 282 drives third and fourth chains 296 and 298. As will be described in further detail herein, third and fourth chains 296 and 298 carry actuation pins 288 which engage linkages 180, 181 and thereby raise, lower, and pull scraper 256. Rollers 266 carry the scraper assembly along rails 264.

Referring again to FIG. 9, it can be seen that motor 270 is not directly connected to drive shafts 272 and 274 in the preferred embodiment, but rather, includes gear box or reducer 290 having output shafts 292 which are then connected to drive shafts 272 and 274 via couplings 294. The drive shafts are further supported by bearings 294*a*. Single sprockets 276 and 278 are connected to double sprockets 280 and 282, respectively, via first and second chains 284 and 286. It can be seen that third and fourth single sprockets 100 and 102 are provided at front end 136 of collection bed 250. Engaged with the third and fourth single sprockets 100, 102 and the corresponding driving sprockets in the double set 280, 282 are third and fourth chains 296, 298, sometimes referred to as the carrier chains. Thus the carrier chains extend from the load station end of the machine past the end 136*a* nearest the laser. The ends 136, 136*a* roughly coincide with the aforementioned X-coordinate $42_x$ which defines the maximum traverse of the nozzle 29 across the cutting tool. Upper chain guides 296*a*, 298*a* and lower chain guides 296*b*, 298*b* are carried by C-shaped brackets 296*c*, 298*c*. The brackets 296*c*, 298*c* are fixed to the associated machine leg with the chain guides underlying the associated upper and lower runs of the respective chains, to prevent the chains from sagging. The chain guides underlie the carrier chains 296, 298 for the length of their run between their driving sprockets, and a similar chain guide underlies the upper run of the input chains 284, 286 interposed between the drive sprockets,276, 278 and the driving sprockets 280, 282. In addition, blocks 296*d*, 298*d* are positioned to overlie the upper run of the chains 296, 298 so as to trap the chain between the blocks 296*d*, 298*d* and the upper chain guides 296*a*, 298*a* to prevent the weight imposed on the upper run during the retraction cycle, when the forward end of the plow is being carried, from causing the chain to derail.

The motor 270, when energized, drives through the gear box and the drive shafts to the input chains 284, 286. The input chains drive the double sprockets 280, 282 which in turn drive the carrier chains 296, 298. The carrier chains 296, 298, as will be further described below, control the movement of the scraper assembly 256 across the machine. That control is achieved by the carrier chains 296, 298 which produce in sequence a cleaning pass (from end 136*a* to end 136) with the plow in contact with the bed, a lifting operation which raises the plow above the slag collection surface, and a retraction pass which returns the plow to its home protected position prior to the next cycle. This is accomplished by means of a simple and reliable drive and drive motor which need not be reversible.

It is important to understand that the depiction of FIG. 9 is but one embodiment of the present invention, and that in alternative embodiments, other drive mechanisms are possible and that the location of the motor 270, and use and location of gear box 290, as well as the various drive shafts, sprockets, and chains, can be altered and still fall within the scope of the present invention. What is important to understand is that the entire drive mechanism is provided outside of the cutting area and is therefore outside the lateral and longitudinal movements of laser beam 26.

With the overview of the drive assembly, positioned and shrouded so that its elements are protected from the laser and from scrap, now understood, attention will be directed to the details of the scraper assembly 256. Those details will best be appreciated with reference to FIGS. 10–13.

Figure 11:
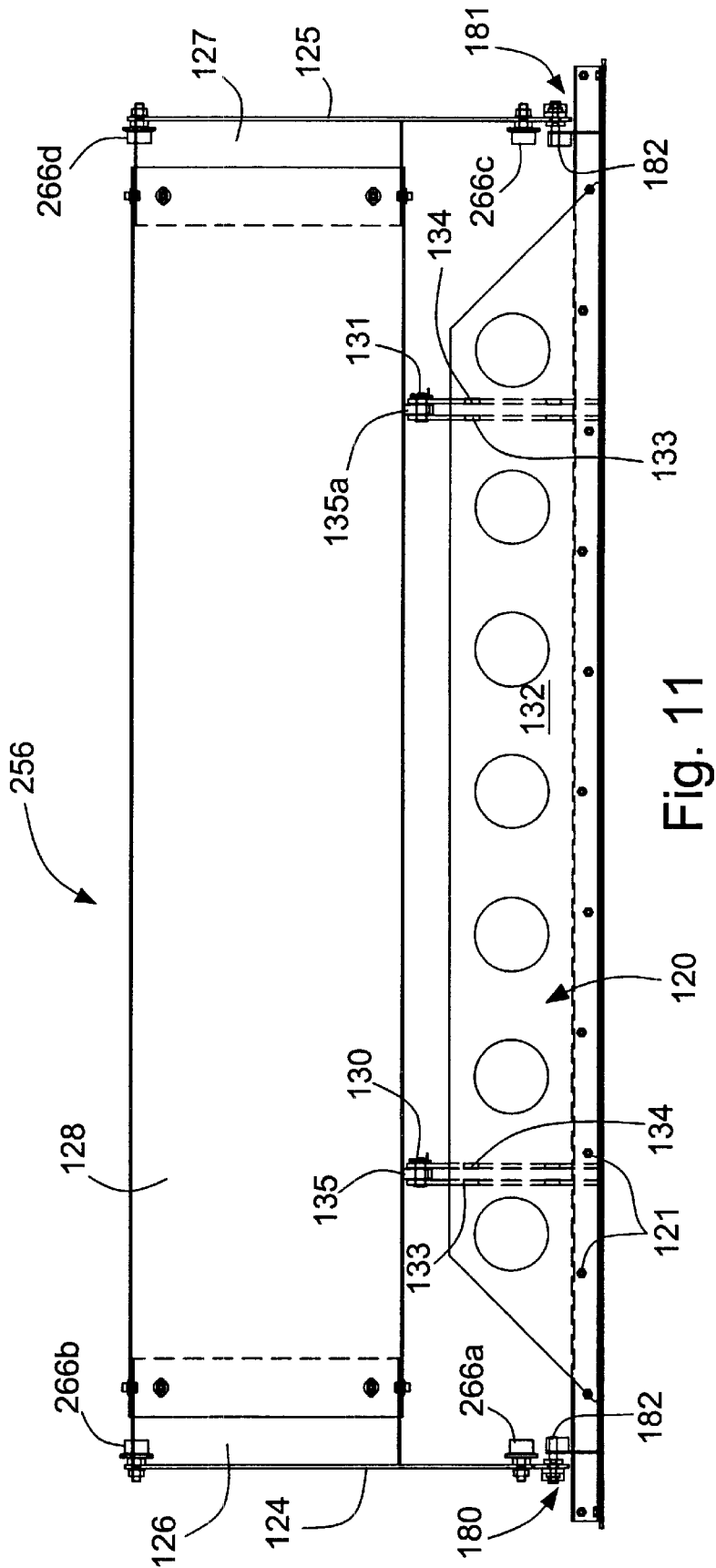
FIG. 11 is a plan view showing the scraper assembly elements of a scrap removal system.

The main functional element of the scraper 256 is a plow assembly 120 which carries, at its lower edge, the scraper pad 260. FIG. 11 shows threaded weld nuts 121 adapted to receive fasteners 122 (FIG. 12) for fixing the scraping pad in place. The plow assembly 120 is carried fore and aft in performing its scraping and retraction function by a pair of end plates 124, 125. Rollers 266*a*–266*d* ride on the aforementioned track 264 (FIG. 12) to carry the end plates 124, 125 along the path established by the track. For rigidifying the scraper assembly, the end plates 124, 125 have inwardly projecting flanges 126, 127 secured to a fabricated beam 128 which fixedly connects end plates 124, 125 together and provides attachment points and a pushing member for the scraper assembly. The end plates and interconnecting member 128 are sometimes collectively referred to herein as the scraper base. The fabricated beam 128 can simply be a C-shaped section, internally braced as necessary to provide structural rigidity.

End plates 124, 125, carried by the rollers 266 on the tracks 264 support beam 128 slightly above the surface of the slag collection bed 250. This base assembly is carried back and forth along the tracks in a linear path under motive power transmitted by the drive chain. The plow assembly 120 is affixed to the beam pivots 130, 131. Plow 120 carries upstanding blade 120*a*, below which the scraper pad 260 is mounted, and a rigidifying flange 132 extending back toward beam 128. Two sets of paired spaced arms 133, 134 project from the back of the plow 120 and embrace apertured blocks 135, 135*a* on beam 128. A pivot pin 130, 131 is inserted through aligned apertures so that the plow 120 can pivot with respect to the beam. A linkage mechanism 180, 181 is arranged at the forward end of plow 120 and is adapted to controllably raise and lower the plow under control of the chain drive. For that purpose, affixed to the backside of the plow are lifting pads 182 adapted to be engaged by lifting pins 147 on each linkage 180,181.

Figure 14:
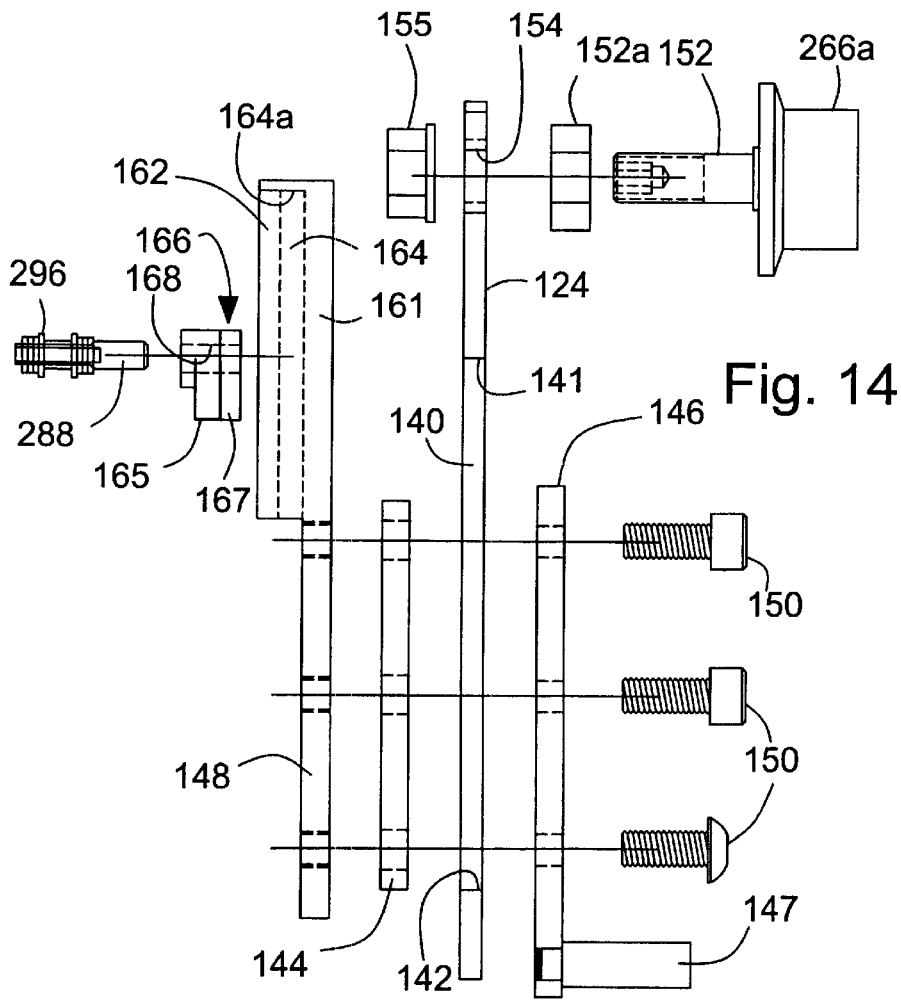
FIG. 14 is an exploded view showing the parts which make up one of the scraper assembly drive linkages.
Figure 16A:
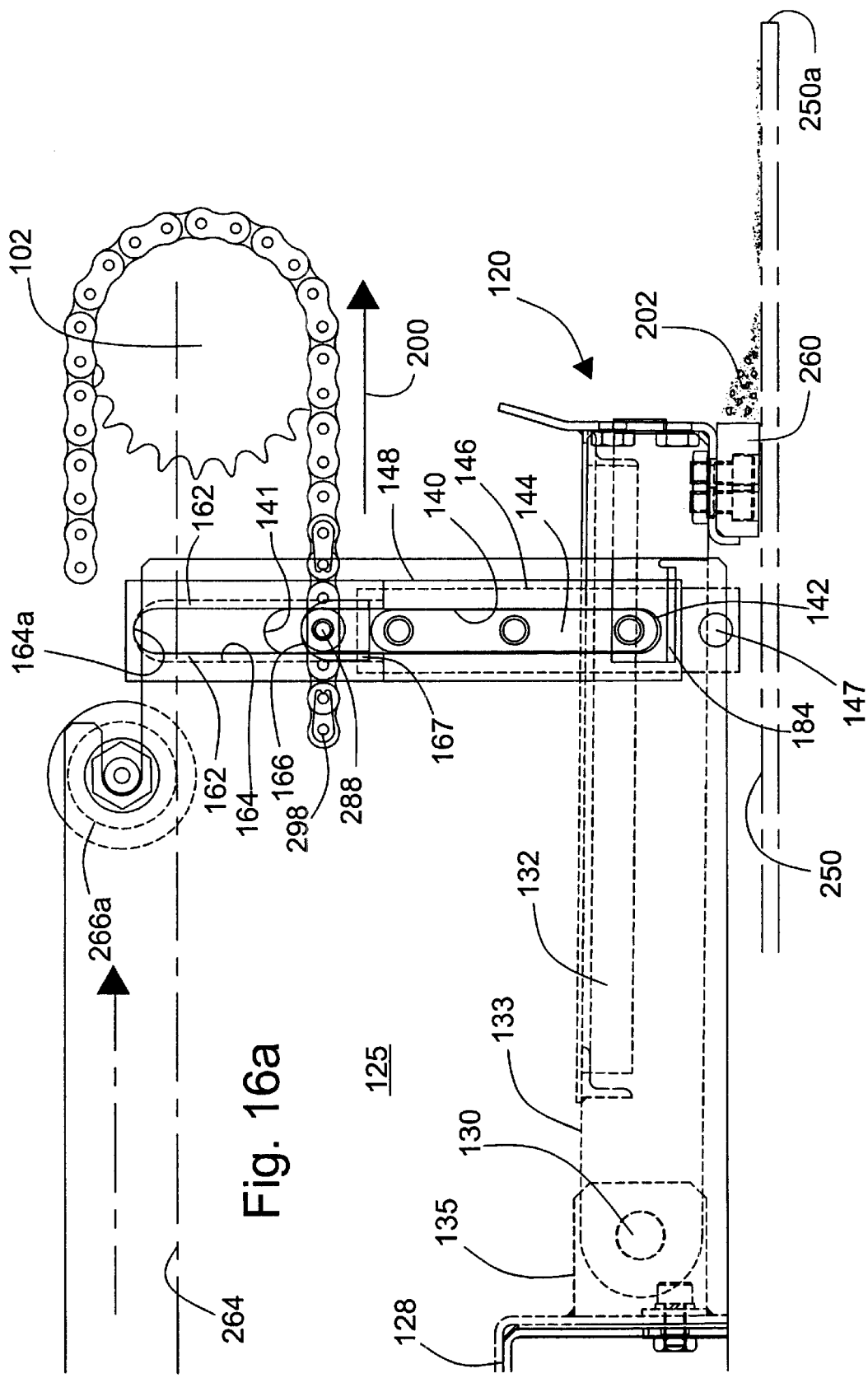
FIGS. 16a—16e are sequential diagrams taken generally along the line 16—16 of FIG. 3, showing the scrap removal system and drive in a number of operating positions.

The linkage is shown in front elevation in FIGS. 12 and 13, in end elevation in the sequential diagrams beginning with FIG. 16*a*, and in exploded view in FIG. 14. Referring primarily to the exploded view, but with reference to the front and end elevations for orientation, it will be appreciated that the end plate 124 has an elongated slot 140 formed therein, the upper and lower extremities of the slot being indicated by reference number 141, 142. An elongated key 144 is sized to fit within the slot 140 and to be able to freely move and up down along the slot. The key is slightly thicker than end plate 124, so that additional members may bracket the key, be affixed together, then slide up and down along the slot as a unit. The additional members include a lifting bracket 146 and actuator plate 148. These elements and the key are attached by bolts 150 engaging threaded apertures in the bracket 148, to sandwich the lifting bracket 146, the key 144 and the actuator plate 148, with the key fitting slidingly within the slot 140. The bracket 148, key 144 and plate 146 thus can move up and down in slot 140 in end plates 124, 125. The slot is made somewhat longer than the required amount of travel of the vertical linkage to accommodate for wear of the pad and tolerances.

End plate 124, as noted previously, is carried by rollers, one of which 266*a* is illustrated in FIG. 14. The roller has a shank 152 which passes through a spacer 152*a* then through an aperture 154 in the plate 124, whereupon it is fixed in place by a flanged nut 155.

The actuator plate 148, has a T-slot shaped channel 164 with a closed top 164*a*. A solid back 161 and overhanging flanges 162 form the T-slot 164 in which rides an enlarged flange portion 167 of a drive shoe 166. The shoe 166 can move up and down in T-slot 164 while being retained by overhanging flanges 162. The shoe has an aperture 168 in which is inserted an actuator pin 288 carried on the drive chain. The shoe 166 has two normal operating positions within its slot 164. In a lowermost position, below that illustrated in FIG. 14, it serves to carry the scraper mechanism forward in a cleaning pass to remove debris from the slag collection bed. In its uppermost position, above that shown in FIG. 14, it serves to carry the scraper assembly back to its home position on a retract pass. It is the movement between those two positions which is of interest in lifting the plow from its operative position in contact with the slag collection plate, to its raised position in which it can be retracted without pulling scrap back into the machine.

The purpose of the linkage can be best understood with reference to FIG. 12. There it is shown that the plow assembly 120 has an extended section 120b which extends to the upstanding machine sidewall, and thus runs below the supporting angle 262 and protective shield 265 which cover the drive mechanism. It is preferred to limit the height of the drive mechanism, and thus to position the drive elements fairly close to the top of the plow assembly. That leaves a limited amount of room, in some cases on the order of just over an inch, for raising the plow, without having the extended portion 120b interfere with the drive elements. It is necessary to utilize sprockets appropriately sized for the drive chain, and those sprockets are greater than one inch in diameter. The linkages 180, 181 therefore provide a lost motion mechanism which will translate the several inch rise of the drive pin 288 when it goes from the lower to the upper run of the chain, into a lift of only about an inch for the end of the plow assembly.

Figure 15A:
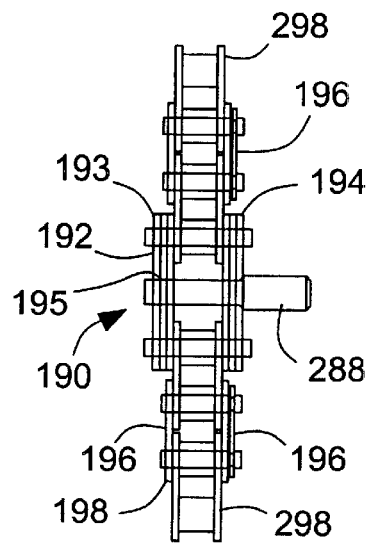
FIGS. 15a and 15b are side and front elevations of a link set which carries the drive pin.
Figure 15B:
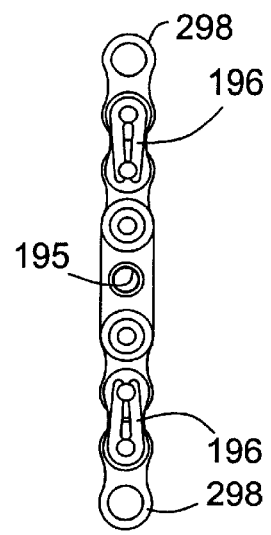

The manner in which that is accomplished will be best understood with reference to the sequential diagrams of FIGS. 16a–16e. In these figures, certain elements such as the key 144, slot 140 and lifting pin 147, which technically should be shown in hidden lines, are shown in solid lines for clarity. The chain 298 is always driven in the same direction, counterclockwise as shown in these figures, as denoted by arrow 200. The chain carries a drive link set 190 whose details are illustrated in FIGS. 15a and 15b. Those figures show a normal section of drive chain 298 having affixed thereto a special link set 190. The link set includes a drive pin 288 affixed to a reinforced center link 192. The strength of the center link 192 is enhanced by utilizing multiple end plates 193, 194 riveted in place, to prevent the pin 288, also riveted in place, from retracting from the aperture 195 which carries it. Connector links 196 secure the special link set 190 to the remainder of the chain run 298. There is one drive link on each of the driving chains 296, 298, and they are arranged opposite one another as suggested in FIG. 9 to carry the scraper assembly forward or backward as will now be described.

As shown in FIG. 16a the drive pin 288 is engaged in the aperture 168 in the drive coupling 166 which is riding in its lower position in its slot 164. The length of the key 144 within its slot 140 maintains the linkages 180, 181 substantially perpendicular to the end plates 125, 126, which it is recalled are supported by rollers 266 riding on tracks represented by the dashed line 264. The plow assembly 120 is shown in its operative position with the scraper pad 260 in contact with the slag collection bed, and moving a collection of debris indicated at 202 to the right. It is noted that the scraper pivot 130 is indicated at the left of the drawing and is attached to beam 128 which acts as a pusher. As the chain drives toward the end of the slag collection bed as indicated by the arrow 200, the drive pins 288 are the driving members which act through the drive shoes 166 and the linkages 180, 181 to carry the entire scraper arrangement forward, with the scraper pad 260 in contact with the bed.

Figure 16B:
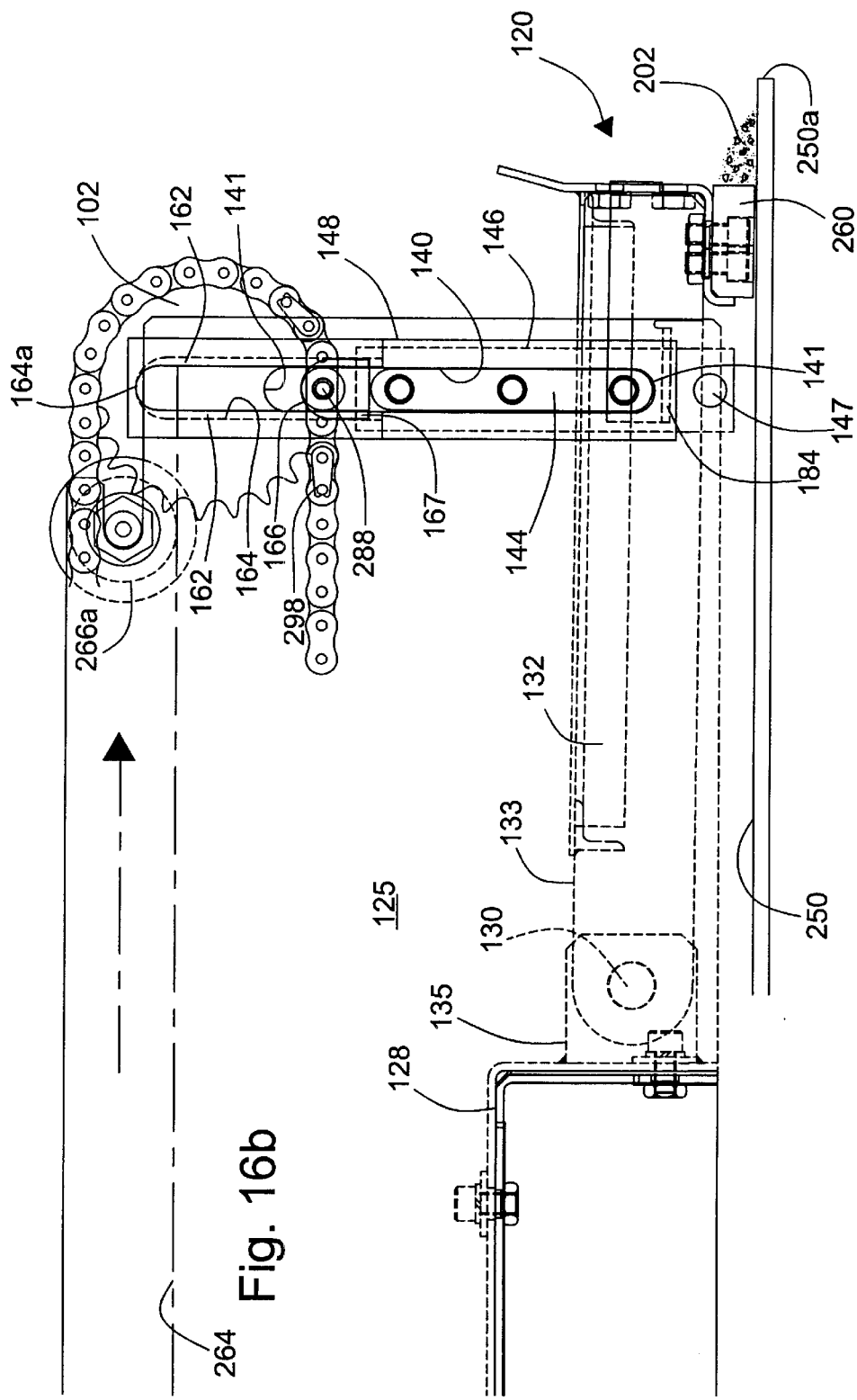
Figure 16C:
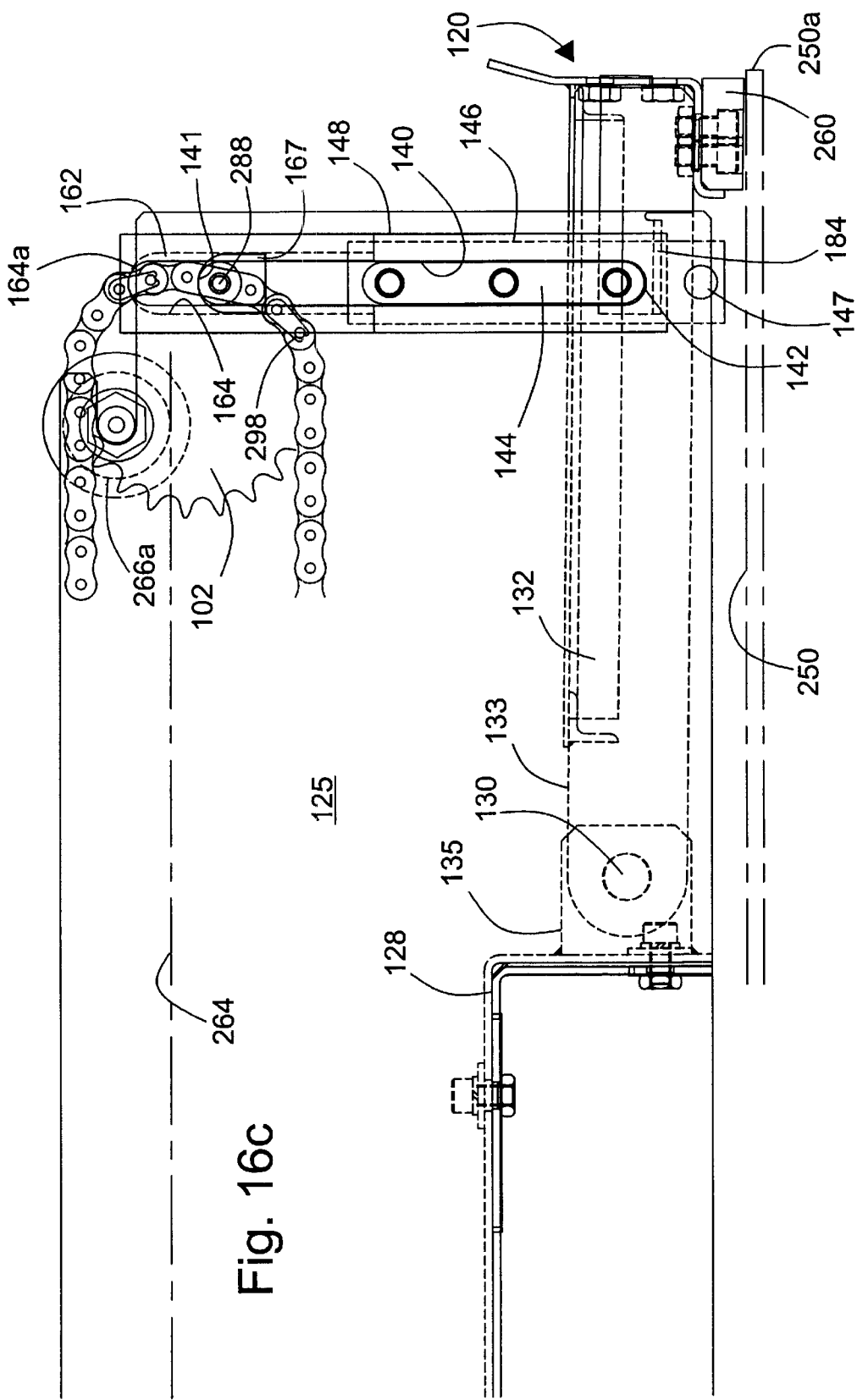
Figure 16D:
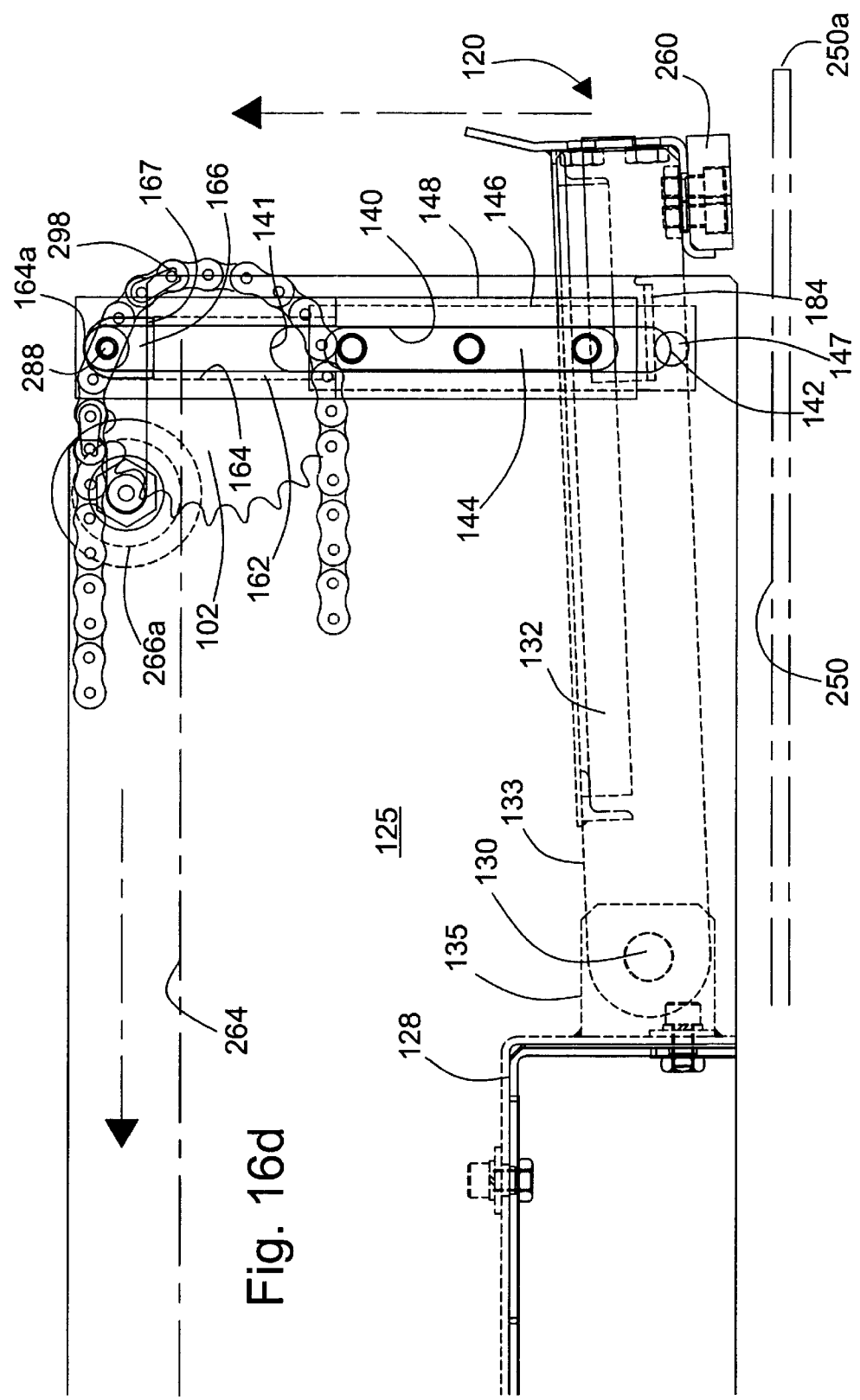
Figure 16E:
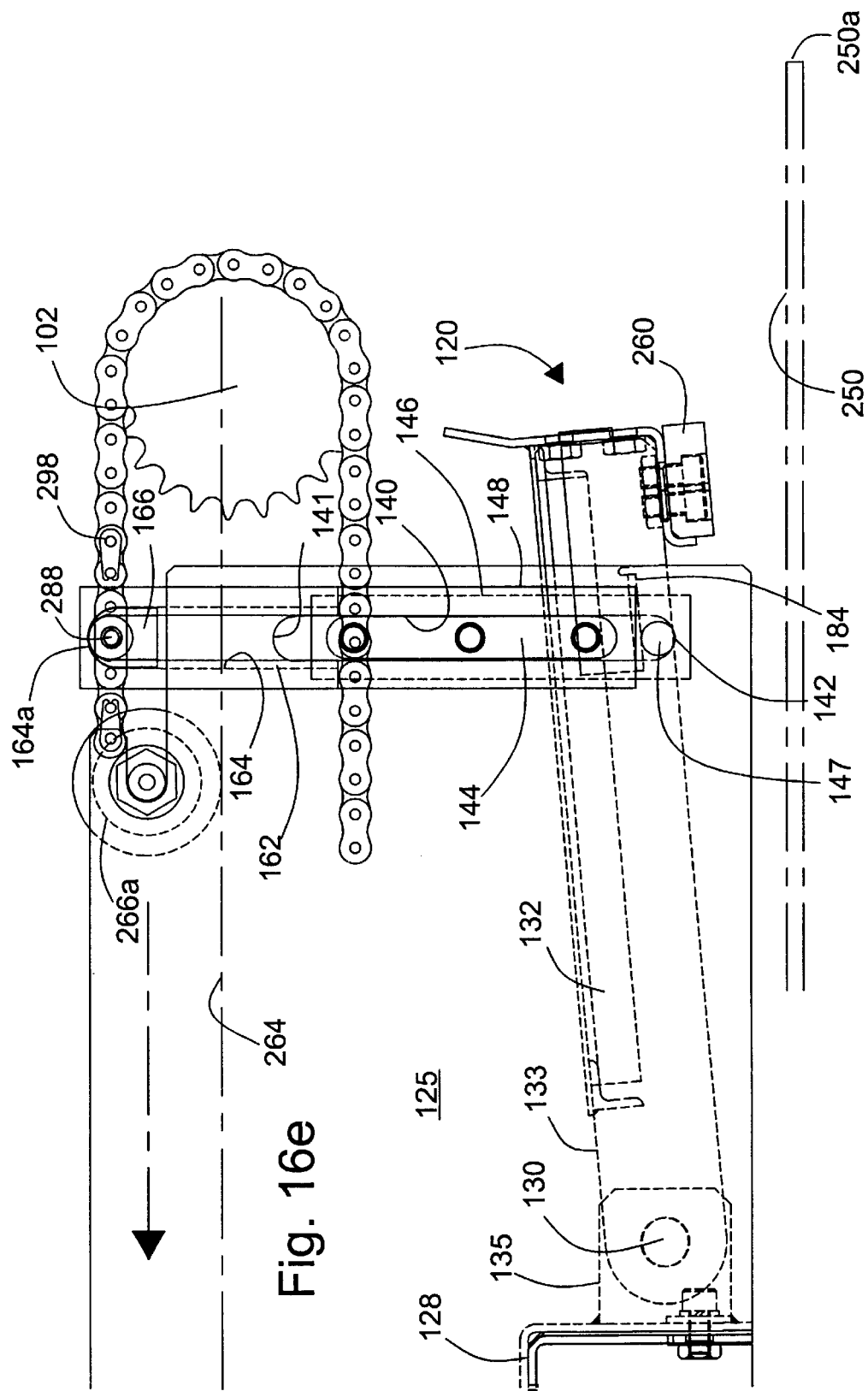

FIG. 16b shows the arrangement nearing the end of the cleaning pass where the linkage has reached the sprocket 102. The scraper pad 260 is now approaching the end 250a of the slag collection bed. As the chain continues to rotate, the drive pin is now moved slightly further forward, by the distance of the radius of the sprocket, and also begins to lift. It will be seen that the drive shoe 166 begins to raise in its slot 164, but for the initial degree of travel, including that shown at FIG. 16c, is without effect on the scraper blade, except that the scraper blade is carried forward to the end of the bed to push the debris into a collection bin. As the chain continues to rotate, however, the drive shoe 166 is further raised by the drive pin 288 until the shoe 166 reaches the top 164a of the slot 164. At that point farther upward travel of the shoe 166 lifts the actuator bracket 148. The actuator bracket is attached through the key 144 to the lifting bracket 146, so that the key 144 slides within its slot 140 in the plate 125. The plate 125 maintains its normal position, but the linkage mechanism rises, pulling the key 144 upwardly in its slot 140, to raise the lifting pin 147. As shown by concurrent reference to FIG. 13 and FIG. 16d, the lifting pin 147 contacts the lower surface of the lifting bracket 184, and raises the front end of the plow. The plow assembly pivots about the pivot point 130, so that the entire assembly including beam 128 and end plate 125 remain in their normal orientation, but only the front end 120 of the plow is lifted. As the chain continues to drive, the pin 288 reaches the upward run as shown in FIG. 16e, for translation on a retract pass back to the original home position, at the double sprocket. When the scraper returns to its home position, out of the path of the laser, the drive motor is deenergized, allowing the scraper to remain in a shielded position until the next cycle is triggered.

It is convenient when using a loading system as in the illustrated machine to operate the scraper assembly when changing pallets. A pallet drive is utilized to remove a pallet which has been completely processed from the machine after the workpiece on it is cut, to transfer it to a pallet preparation station (not shown), then to load a second pallet with a new workpiece into the machine. While those operations are underway, the numerical control or the operator can actuate the scraper assembly to make a pass across the slag collection bed and scrape the debris from the system during the pallet unload and load cycle.

Figure 17:
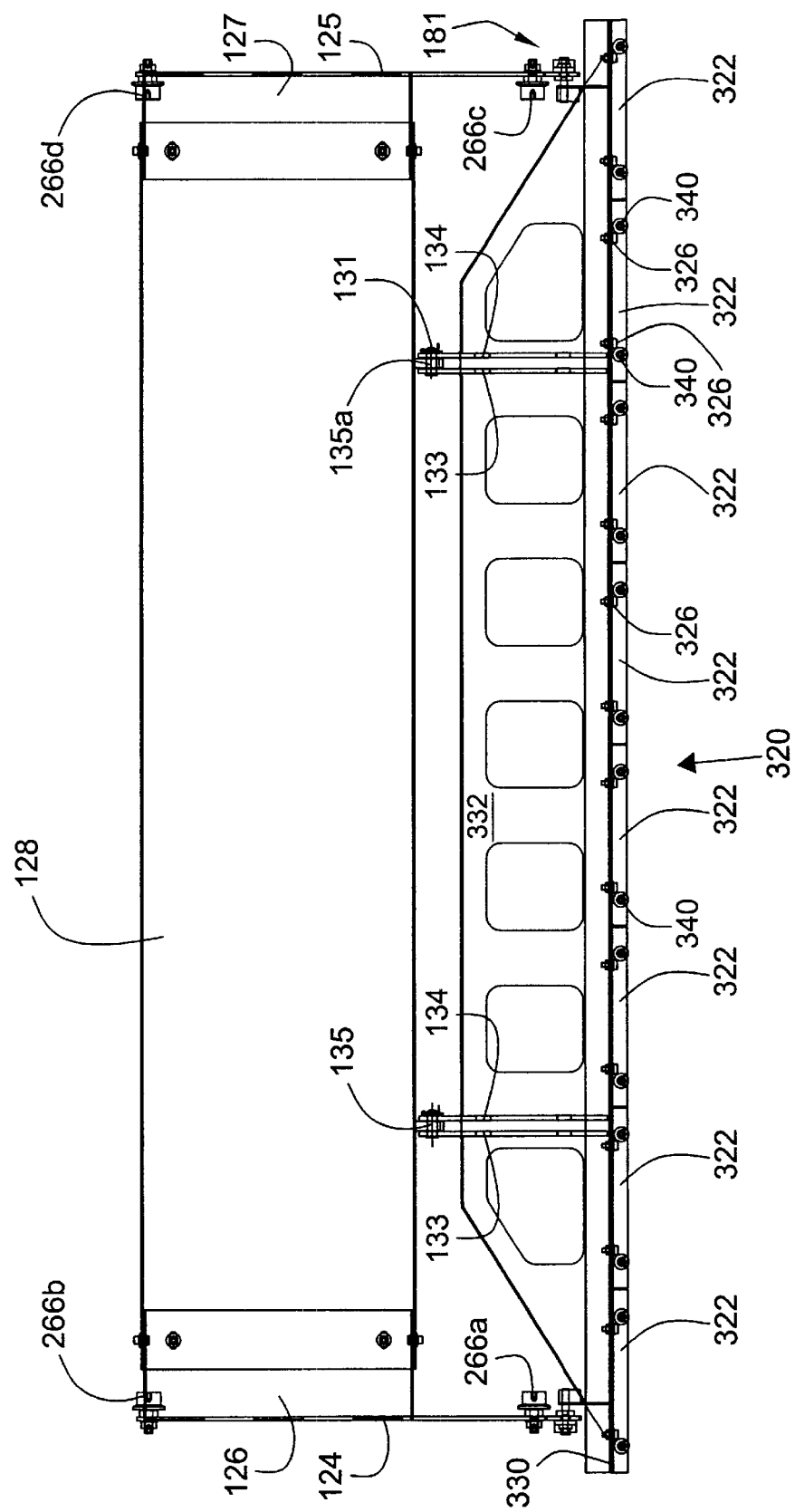
FIG. 17 is a plan view showing the scraper assembly elements of a currently preferred form of scrap removal system.
Figure 18:
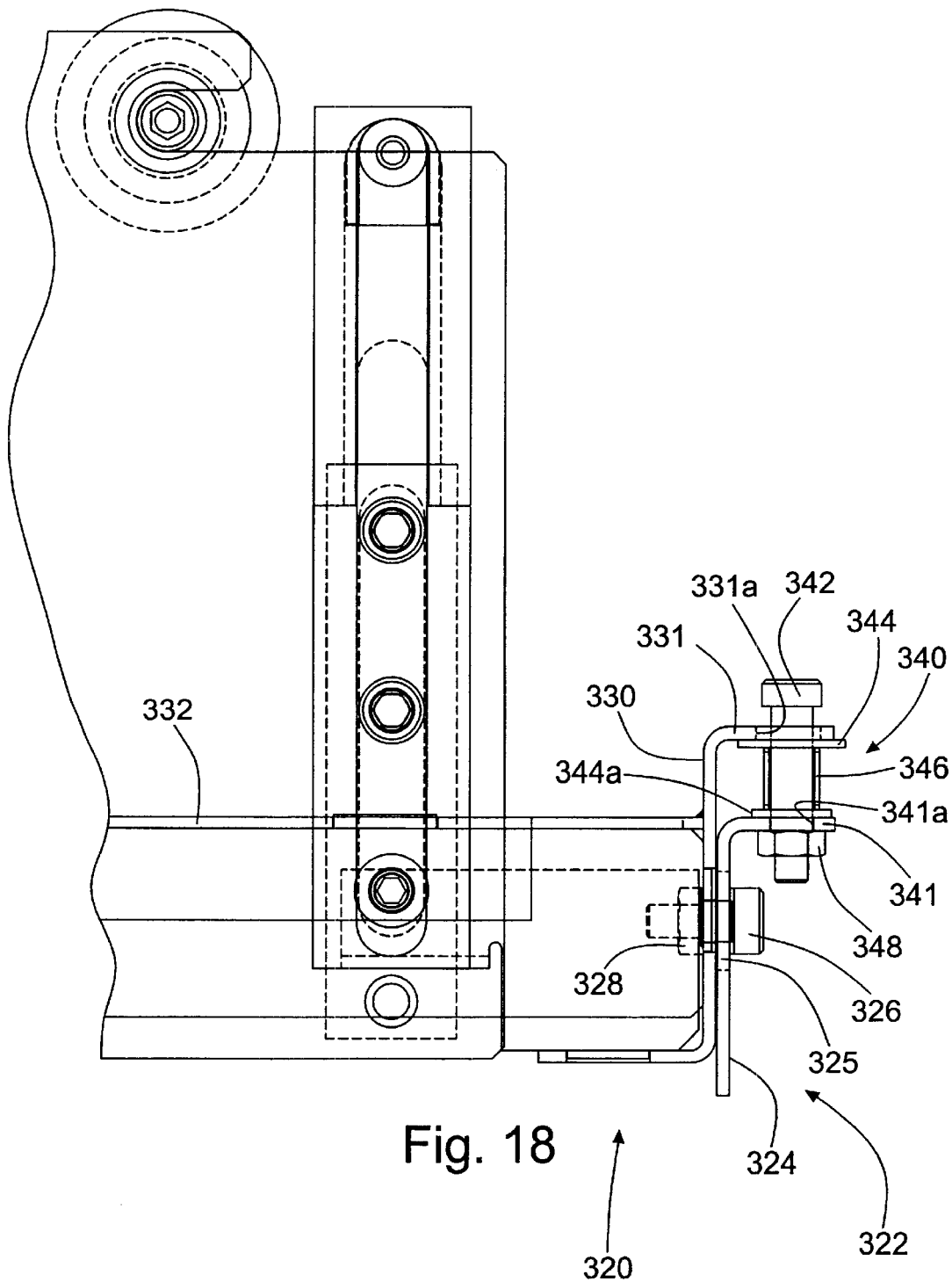
FIG. 18 is a diagram similar to FIG. 16a, showing the currently preferred scrap removal system.

A currently preferred form of the plow assembly or scraper bladeis illustrated in FIGS. 17 and 18. Occasionally, the surface of the scrap collection bed may include minor variations in height along the width of the bed, usually 0.030 inches or less. Accordingly, the currently preferred plow assembly self-adjusts to accommodate minor variations in the surface of the scrap collection bed. This is primarily accomplished by two features. First, the scraper blade is segmented into multiple individual blades. Second, each of the individual blades is mounted to automatically adjust relative to the bed surface in response to small variations in the surface.

As shown in FIG. 17, the preferred plow assembly 320 includes a plurality of individual blade assemblies 322 adjacent each other to span the width of the collection bed. Each of the assemblies 322 are independent of the others, and therefore can independently adjust by way of adjustment mechanisms 340 to accommodate variations in the surface.

Each of the blade assemblies 322 are adjustably attached to a support bracket 330 via bolts 326. The support bracket 330 in turn is attached to a rigidifying flange 332 which extends back toward beam 128. Two sets of paired spaced arms 133, 134 project from the back of the plow assembly 320 and pivotally embrace apertured blocks 135, 135a on beam 128, thereby allowing the plow to be raised and lowered as previously discussed.

Turning to FIG. 18, a side view of the plow assembly 320 is shown, much as in FIG. 16a. Support bracket 330 connects the plow 320 to the beam 128 as well as the structure associated with raising and lowering the scraper. A blade assembly 322, including scraper blade 324, is slidably attached to the support bracket 330 and adapted for movement upwardly and downwardly relative to the support bracket 330. Scraper blade 324 is preferably of metal, and projects downwardly to contact the slag collection bed 250. The blade 324 includes slots 325 through which it is attached to the support bracket 330 by shoulder bolts 326 fixed in weldnuts 328 which are attached to the rear surface of the support bracket 330. Slot 325 formed in the blade 326 permits vertical movement of the blade with respect to the bracket 330.

An automatic adjustment mechanism 340 is provided to control the vertical movement of the scraper blades 324 of each blade assembly 322. The support bracket 330 includes a flange 331 which overlies a scraper flange 341 of the scraper blade 324. The adjustment mechanism 340 includes a shoulder bolt 342 extending through corresponding apertures 331a, 341a, in flanges 331 and 341 and affixed in weldnut 348 attached to the lower surface of flange 341. The aperture 33 1a is oversize to provide a loose fit to allow the blade 324 to move upwardly or downwardly with respect to the support bracket 330. For biasing the scraper blade 324 downwardly toward the bed 250, a spring 346 is interposed between the flanges 331, 341. Oversized washers 344, 344a prevent the spring 346 from entering the apertures in the flanges 331, 341. When the plow is in its lowered position, the adjustment mechanism 340 causes the individual scraper blades 324 to contact with the bed 250, while also permitting automatic adjustment in the vertical direction, to accommodate minor variations in the surface of the bed. Preferably, scraper blades 324 are given about 0.1 inches of vertical adjustment, sufficient to accommodate typical variations of about 0.030 inches, as well as wear on the scraper blade. Preferably the length of scraper blades 324 is equal to or slightly less than the width of protective strips 78a–78f (FIG. 8). Further, each scraper blade is preferably located on support bracket 330 such that it is directly over a protective strip. Each scraper blade is thus attached in such manner that it can follow the contour of a protective strip thereby enhancing the cleaning operation.

In summary, and referring again to FIG. 1, when a laser-equipped cutting machine is to be operated, a worktable or pallet with mounted workpiece is cycled into the machine. The cutting head 30 is then activated to begin traverse under computer control. The laser is energized and the laser beam, along with a flow of assist gas is projected onto the surface of the workpiece. The laser penetrates the workpiece and begins to cut parts as determined by the CNC control. The laser moves from nest to nest cutting the parts until the operation is complete. The slag and scrap which is generated during the cuts simply fall through the worktable onto the slag collection bed.The energy of the remnant laser beam which projects through the plate and impinges on the surface of collection bed and the slag collected on the bed can create severe local increases in temperatures of shielding plates 78a, 78b, but without damage to the underling bed. When the workpiece cuts are completed, the machine cycles to remove the worktable with the skeleton and cut parts, the slag removal system cycles to scrape the slag from the collection trough, a new worktable with a new workpiece is cycled into the machine, and the process repeated.

The machine can operate on extended continuous cycles to produce a large number of parts at high efficiency. If due to a malfunction or other occurrence, the slag collection surface is sufficiently damaged it is a relatively simple matter to have one or more of the plates 78a, removed and replaced, whereupon the machine can be returned to service. Even if it is necessary to replace the entire slag collection surface, that can be done with a relatively short and straightforward service procedure, without undue expense, and with a fairly short down time for the machine.

The scrap removal system is well-suited for a high-power laser, and is completely shielded from the path of the laser during cutting. The drive extends along the length of the bed on both sides thereof, but laterally outside of the path of the laser. The prime mover for the drive is also positioned so that it engages both drive members but is also in a shielded location. A reasonably light but adequately rigidified scraper assembly is carried across the slag collection bed by the drive members. The plow of the scraper assembly extends across the full width of the machine so that slag is removed in a single pass in a highly efficient manner. Preferably, the scraper is segmented into multiple blade assemblies, each assembly being automatically adjustable to accommodate variations in the surface of the bed. Such a system removes substantially all the slag without the need to manually adjust for surface changes. Linkages connect the scraper assembly to the lateral drives and are configured so that the drives carry the plow through the system on a cleaning pass, raise the plow out of contact with the slag collection bed, return the raised plow to its original home position, then lower the plow prior to commencing the next cleaning pass. The elements of the drive are not only simple and shielded but they are accessible for service, and the slag mechanism can operate reliably over a long period of time. If a malfunction occurs, the mechanism can be readily serviced without creating significant machine down time.

What is claimed is:

1. A heavy-duty laser plate cutting machine comprising in combination:
   a laser source producing a laser beam having a high output power for performing cutting operations on a workpiece;
   a slag collection bed underlying the workpiece and capable of absorbing the energy of the laser beam without permanent damage to the machine;
   a slag scraper having a stowed position out of the path of the laser when the laser is cutting, the slag scraper configured to be cycled across the slag collection bed to remove slag when the laser is off; and
   the slag collection bed comprising an insulation layer disposed on a slag collection bed support and a laser shield overlying the insulation layer for absorbing remnant laser energy to protect the slag collection bed support therefrom.

2. The combination of claim 1, wherein the insulation layer comprises at least one layer of gypsum board underlying and supporting the laser shield.

3. The combination of claim 1, wherein the insulation layer is of sufficient thickness to protect the slag collection bed support from thermal damage from temperature rise in the laser shield caused by absorption of the remnant laser energy.

4. The combination of claim 1, wherein the laser shield is removably positioned over the insulated layer.

5. The combination of claim 4, wherein the laser shield includes a plurality of individual sections to facilitate partial replacement of the shield.

6. The combination of claim 1, wherein the insulation layer has a sufficient structural support that if the laser shield is locally melted, the insulation layer continues to support the shield until resolidification to aid in maintaining planarity.

7. A heavy-duty laser plate cutting machine comprising in combination:
   a laser source producing a laser beam having a high output power for performing cutting operations on a workpiece in a cutting zone;
   a slag collection bed underlying the workpiece and capable of absorbing the energy of the laser beam without permanent damage to the machine; and
   a slag scraper having a stowed position out of the path of the laser when the laser is cutting, the slag scraper configured to be cycled across the slag collection bed to remove slag when the laser is off;
   the slag scraper comprising
      a drive system having a motor driving a pair of lateral drives; and
      a scraper assembly mounted for translation
         (a) in one direction from the stowed position into the cutting zone for performing a cleaning pass over the slag collection bed;
         (b) in the opposite direction to the stowed position on a retract pass.

8. The combination of claim 7, wherein the scraper assembly includes a base member having rollers engaging a fixed track for supporting the scraper assembly for translation, and a plow section being pivotally connected to the base member.

9. The combination of claim 7, further comprising a first and a second linkage connecting the lateral drives to the scraper assembly for imparting motive force thereto for the cleaning and retract passes.

10. The combination of claim 7, wherein the lateral drives are positioned at respective sides of the slag collection bed but out of the cutting zone.

11. The combination of claim 7, wherein the slag scraper includes a plow adapted to push scrap off of the slag collection bed, the plow being mounted to engage the slag collection bed during the cleaning pass, and out of contact with the bed during the retract pass.

12. The combination of claim 11, wherein the plow is driven such that it traverses motion defined by the cleaning pass, a third motion perpendicular to the cleaning pass wherein the plow is lifted from the bed, the retract pass, and a fourth motion perpendicular to the retract pass wherein the plow is lowered to the collection bed and thereby positioned for subsequent motions.

13. The combination of claim 7 in which the lateral drives are chain drives each carrying a drive link for connection to an associated linkage.

14. The combination of claim 13, wherein the chain drives are located out of the cutting zone and further include overhanging shields for protecting the drives from debris produced during cutting.

15. A heavy-duty laser plate cutting machine comprising in combination:
   a laser source producing a high power laser beam for performing cutting operations on a workpiece;
   a slag bed having a collection surface underlying the workpiece and capable of absorbing the energy of the laser beam without permanent damage to the machine; and
   a slag scraper having a plurality of individual blade sections forming a segmented scraper blade, the individual blade sections being mounted for independent vertical adjustment to independently accommodate variations in the collection surface.

16. The combination of claim 15, wherein the individual blade sections are resiliently biased downwardly and mounted for limited upward movement against the resilient bias to automatically and independently accommodate variations in the collection surface.

17. The combination of claim 15, the cutting machine including a machine base, the slag bed further comprising an insulated layer disposed on the machine base and a laser shield overlying the insulation layer for absorbing remnant laser energy to protect the machine base therefrom, the laser shield providing the collection surface.

18. The combination of claim 15, further comprising a drive system imparting motive force to the slag scraper which is mounted for translation across the slag bed when the laser is off, the slag scraper and drive system located at a stowed position out of the path of the laser when the laser is active.

19. The combination of claim 15, wherein the scraper blade is metal.

20. The combination of claim 19, wherein the slag scraper includes an elongate support for supporting all of the blade sections, slotted connecting arrangements for mounting each blade section with respect to the support for vertical translation, and springs interposed between the support and each blade section for biasing the blade sections toward the collection surface.

* * * * *